(12) United States Patent
Davidson et al.

(10) Patent No.: US 6,533,330 B1
(45) Date of Patent: Mar. 18, 2003

(54) CONNETION TOGETHER OF TUBULAR MEMBERS

(75) Inventors: Paul Davidson, 18 Ploughmans Way, Tytherington, Macclesfield, Cheshire (GB), SK10 2UN; Richard John Wakelin, Harrogate (GB)

(73) Assignee: Paul Davidson (GB)

( * ) Notice: Subject to any disclaimer, the term of this patent is extended or adjusted under 35 U.S.C. 154(b) by 0 days.

(21) Appl. No.: 09/424,908

(22) PCT Filed: Jun. 1, 1998

(86) PCT No.: PCT/GB98/01464

§ 371 (c)(1),
(2), (4) Date: Oct. 11, 2001

(87) PCT Pub. No.: WO98/54505

PCT Pub. Date: Dec. 3, 1998

(30) Foreign Application Priority Data

May 30, 1997 (GB) .............................................. 9711139
Jun. 24, 1997 (GB) .............................................. 9713201
Apr. 7, 1998 (GB) .............................................. 9807492

(51) Int. Cl.⁷ .............................................. F16L 21/08
(52) U.S. Cl. ..................... 285/305; 285/921; 285/81; 285/124.1; 285/124.2; 285/84
(58) Field of Search .............................. 285/319, 921, 285/81, 82, 84, 86, 124.1, 124.2, 124.4

(56) References Cited

U.S. PATENT DOCUMENTS

| | | | | |
|---|---|---|---|---|
| 2,784,987 A | * | 3/1957 | Corcoran ....................... | 285/86 |
| 3,853,338 A | * | 12/1974 | Wilson ......................... | 285/86 |
| 4,058,330 A | * | 11/1977 | Wolf ........................... | 285/423 |
| 4,225,162 A | * | 9/1980 | Dola ........................... | 285/242 |
| 4,332,402 A | * | 6/1982 | Shellhouse .................... | 285/86 |
| 4,834,149 A | * | 5/1989 | Fournier et al. ............... | 604/905 |
| 4,895,570 A | * | 1/1990 | Larkin ......................... | 604/905 |
| 5,141,263 A | * | 8/1992 | Varden ......................... | 285/921 |
| 5,509,911 A | * | 4/1996 | Cottone, Sr. et al. ........... | 285/315 |
| 5,540,463 A | * | 7/1996 | Potokar ........................ | 285/319 |
| 5,725,257 A | * | 3/1998 | Sakane et al. ................. | 285/81 |
| 5,989,240 A | * | 11/1999 | Strowe ......................... | 285/81 |
| 6,155,607 A | * | 12/2000 | Hewitt et al. ................. | 285/81 |

* cited by examiner

Primary Examiner—Eric K. Nicholson
(74) Attorney, Agent, or Firm—Myers Bigel Sibley & Sajovec

(57) ABSTRACT

A connector (1) for connecting together at least two tubular members (3) includes a body (7) having tubular mouth portions, each receiving one of said tubular members. At least one of the mouth portions is provided with means for connecting the body to a tubular member, the connection means comprising sealing means (17) for sealing the body against the tubular member and securing means for preventing relative longitudinal movement between said body and said tubular member. The securing means comprise a first securing member (25) for engagement with the tubular member and being deformable between a tubular member engaging position and a position allowing said first member to be readily moved along the tubular member, and a second securing member (31) being for holding the first securing ember in its tubular member engaging position. The body and first and second securing members are adapted to coact to prevent, in use, relative longitudinal movement between said first securing member and said body. A connection assembly, which includes a plurality of connectors of the invention, is also described.

16 Claims, 10 Drawing Sheets

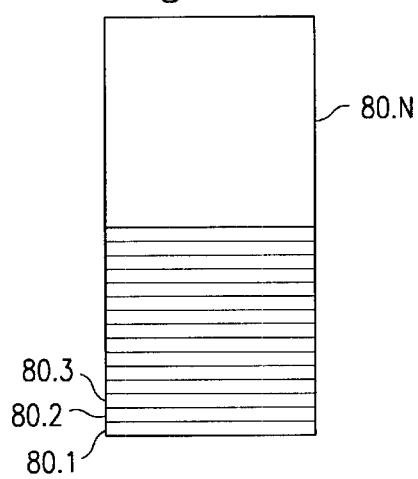
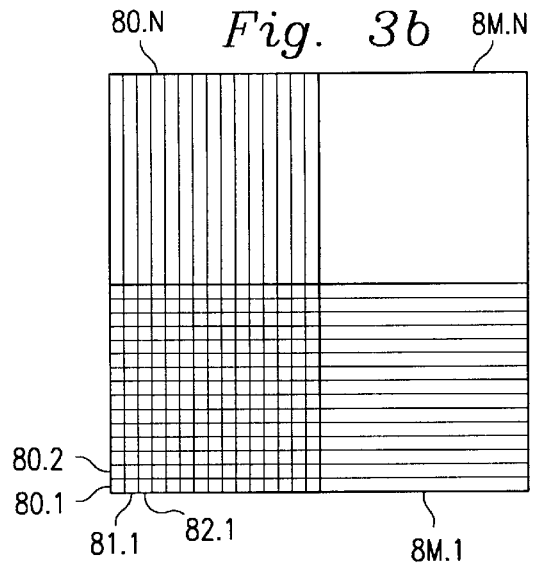
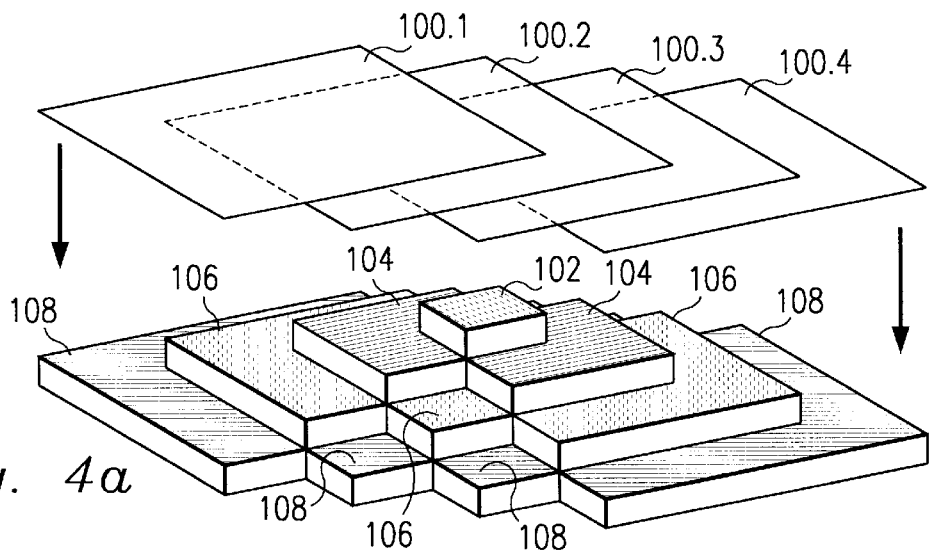
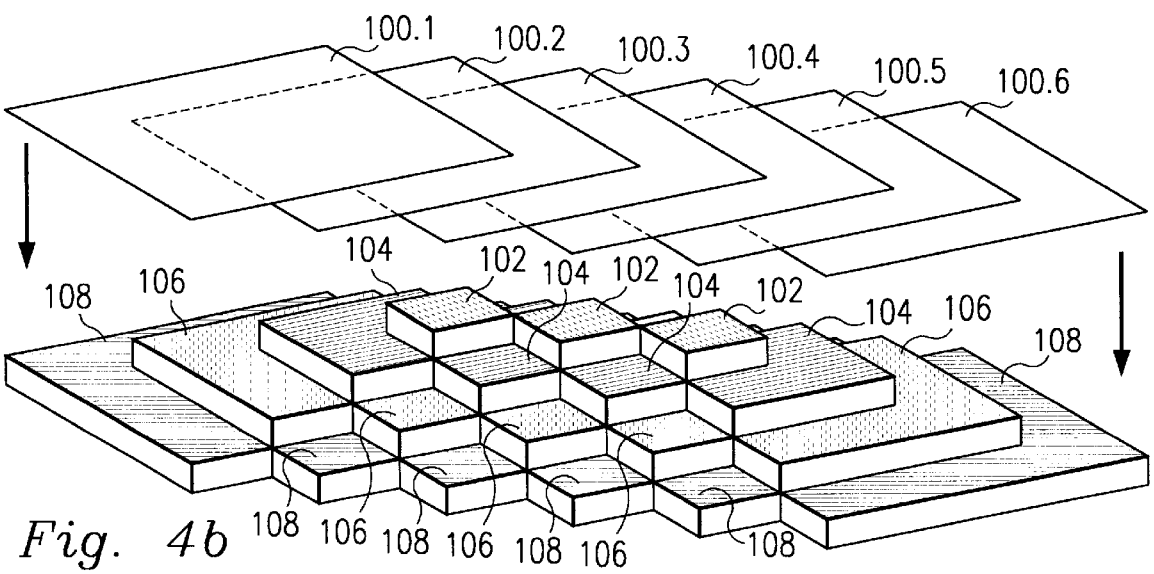

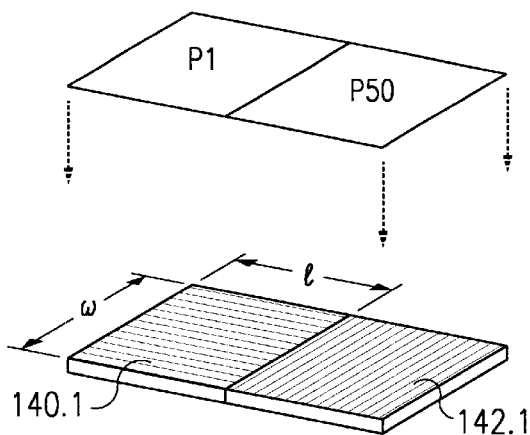
*Fig. 10.1*
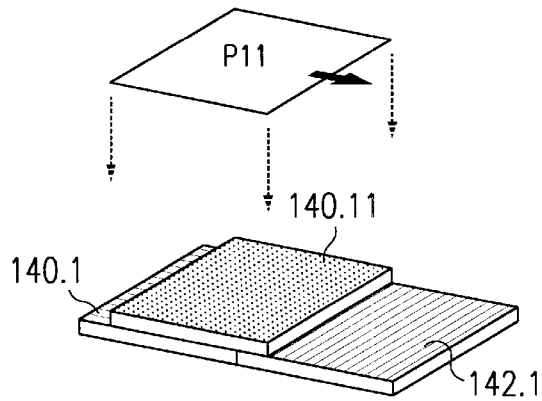
*Fig. 10.2*
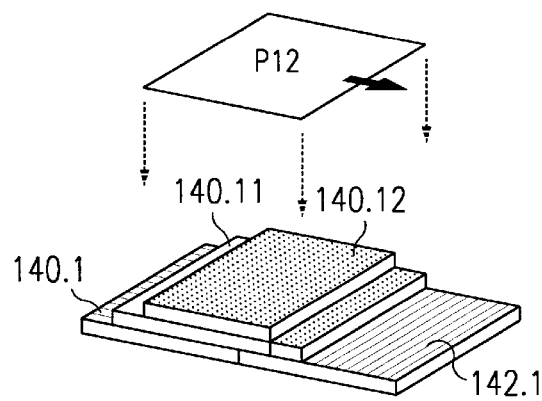
*Fig. 10.3*
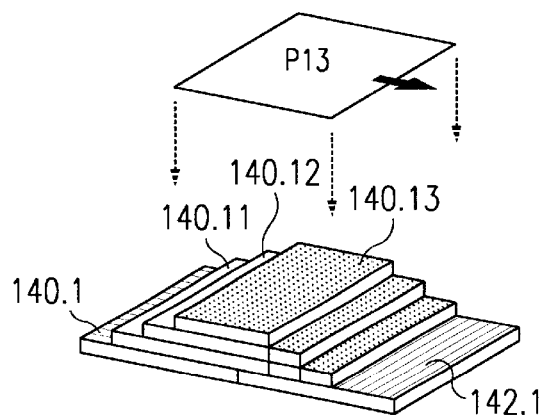
*Fig. 10.4*
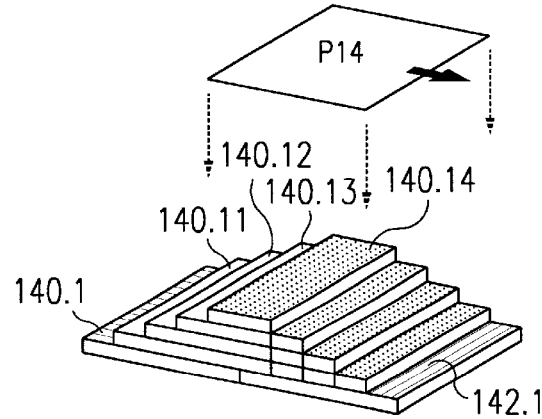
*Fig. 10.5*

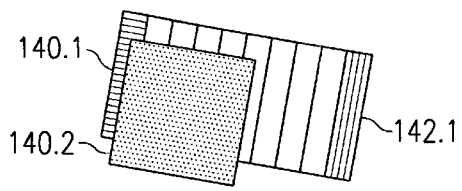
Fig. 10.6
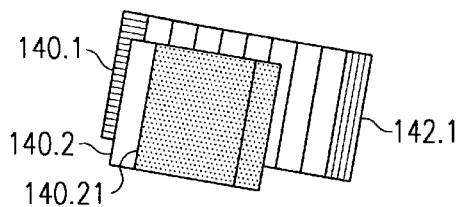
Fig. 10.7
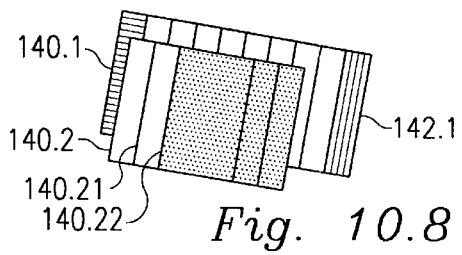
Fig. 10.8
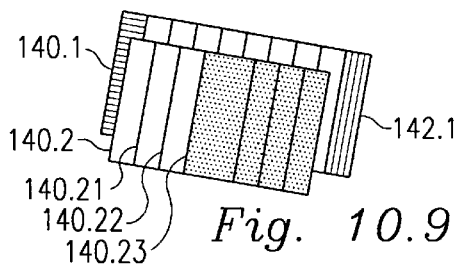
Fig. 10.9
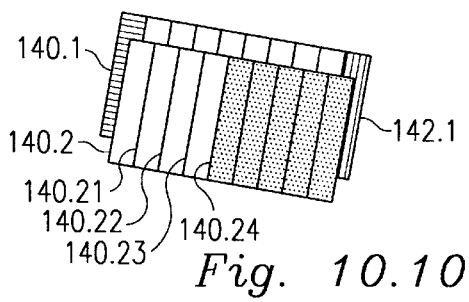
Fig. 10.10
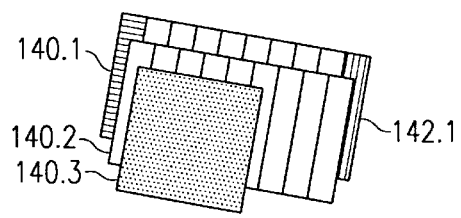
Fig. 10.11
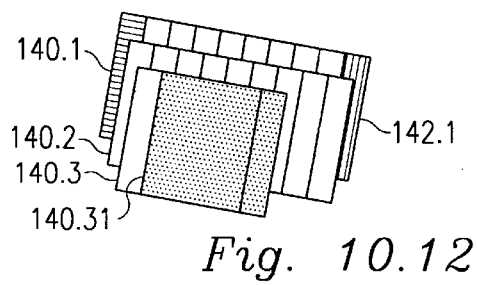
Fig. 10.12
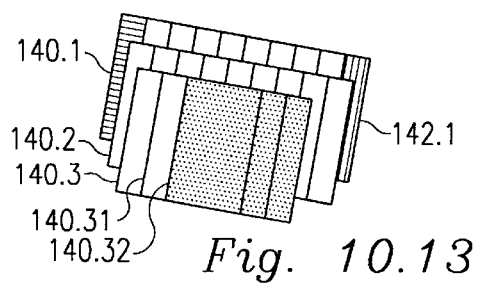
Fig. 10.13

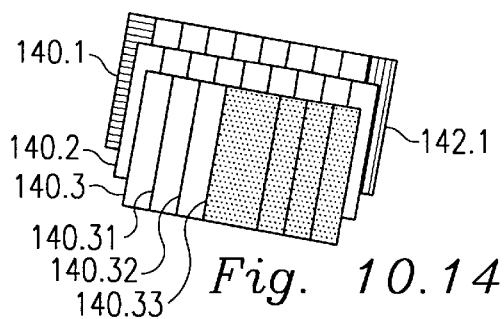
Fig. 10.14
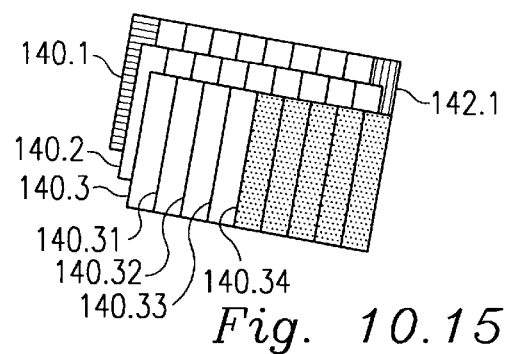
Fig. 10.15
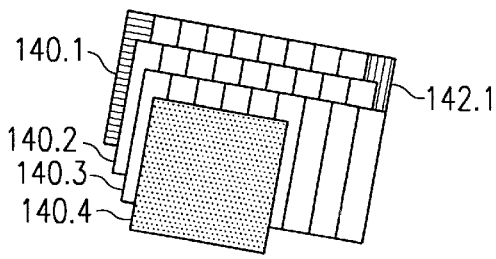
Fig. 10.16
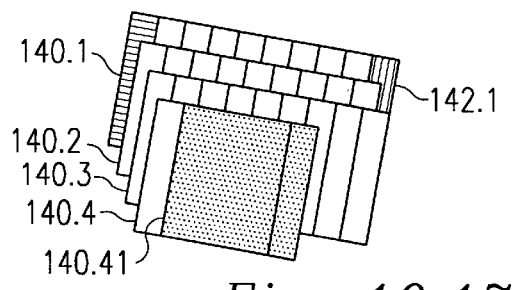
Fig. 10.17
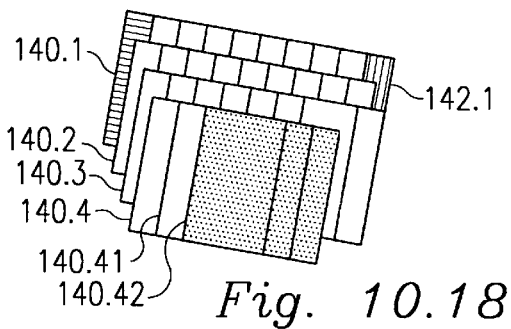
Fig. 10.18
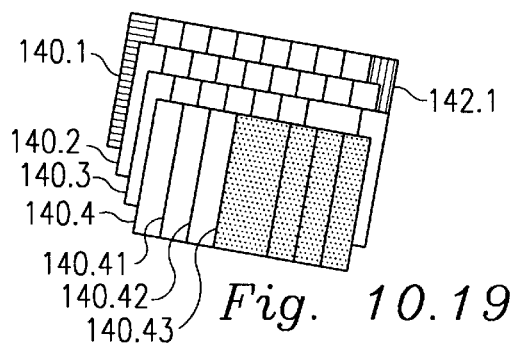
Fig. 10.19
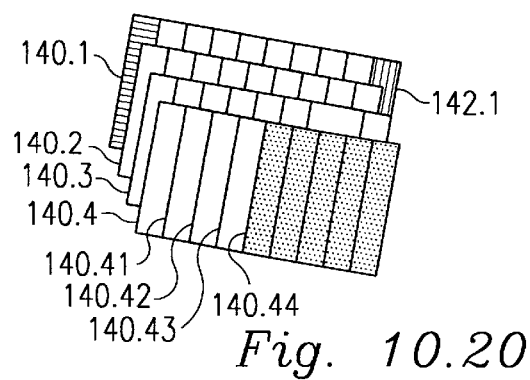
Fig. 10.20

CONNETION TOGETHER OF TUBULAR MEMBERS

RELATED APPLICATIONS

The present application is a National Phase application of PCT/GB98/01464, which claims priority from GB 9711139.7 filed May 30, 1997, GB 9713201.3 filed Jun. 24, 1997, and GB 9807492.5 filed Apr. 7, 1998.

TECHNICAL FIELD

This invention relates to connectors for connecting together at least two tubular members. Connectors with which the present invention is concerned may be used for connecting together two or more pipe ends or may be used to connect, for instance, a pipe end to a pipe fitting such as a tap or some form of metering device. A connector of the present invention may be in the form of a so-called straight coupling for connecting together, for instance, two pipe ends in a linear end-to-end relationship. However, a connector of the present invention may equally be in the form of an elbow connector for connecting, for instance, two pipe ends at right angles to each other. Equally, a connector of the present invention may be in the form of a T-junction connecting, for instance, three pipe ends, two being in line and a third at right angles to the other two.

The present invention is connected with connectors for connecting together, for instance, pipes or pipe fitting made from various materials. Reference will be made hereinafter mainly to plastic pipes but it should be understood that the invention may be applied to metal pipes and also to fittings of different materials.

BACKGROUND OF THE INVENTION

Known connectors are typically compression joints with a substantial numbers of parts, some of which may be easily mislaid, particularly if work is carried out at night or, generally, in poor light. There is a need for a simple connector with few parts which cannot easily be mislaid and which can be easily assembled and disassembled.

STATEMENTS OF INVENTION

According to the present invention there is provided a connector for connecting together at least two tubular members, the connector including a body having tubular mouth portions, each for receiving one of said tubular members, at least one of said mouth portions being provided with means for connecting the body to a tubular member received in said mouth portion, said connection means comprising sealing means for sealing the body against the tubular member and securing means for preventing relative longitudinal movement between said body and said tubular member, said securing means comprising a first securing member for engagement with the tubular member and being deformable between a tubular member engaging position and a position allowing said first securing member to be readily moved along the tubular member, and a second securing member being for holding the first securing member in its tubular member engaging position, said body, said first securing member and said second securing member being adapted to coact to prevent in use, relative longitudinal movement between said first securing member and said body.

Preferably, the second securing member is in the form of a ring or collar movable longitudinally relative to the tubular member and the mouth portion in order to be located in a position wherein the first securing member is held in its mouth portion engaging position.

Preferably, the first securing member is in the form of a ring or collar which is circumferentially discontinuous over at least that part of its length which is for engaging the tubular member, thereby allowing radial deformation of said first securing member. For instance the first securing member may be circumferentially discontinuous along its entire length in which case the member is in the form of a split ring. The member may be made of material giving it a resiliency such that it will tend to recover its original shape once the deforming force is removed.

The first securing member is also preferably provided with an inwardly directed projection, or a plurality of projections, for engaging in one or more recesses located in said tubular member.

As an alternative, or as an addition, to the first securing member having a circumferentially discontinuous portion, it may be provided with means for gripping the outer surface of the tubular member.

The present invention may be realised in different ways as far as the relative locations of the body and the first and second securing members are concerned. For instance, the mouth portion may, in use, be located between the first and second securing members or the first securing member may be located between the mouth portion and the second securing member or the second securing member may be for location between the mouth portion and the first securing member.

Preferably, the first securing member has a portion for engaging the mouth portion and, extending longitudinally from said engaging portion on at least one side thereof is a stabilising portion. The stabilising portion will act to prevent forces which may be applied to the joint acting to displace the first securing member from its tubular member engaging position and, thereby allowing the connection to become disassembled.

Preferably the stabilising portion has a length at least one quarter of the external diameter of the tubular member and more preferably has a length which is at least one half of the external diameter of the tubular member.

It is frequently necessary to connect together a first plurality of tubular members and a second plurality of tubular members and, in some cases, space is at a premium and hence there is a need to provide a connector for connecting together such first and second pluralities of tubular members by a connector which is as compact as possible and, preferably, with as small a total mass as possible. This is often of great importance in applications involving nuclear radiation.

Further, in the interests of general efficiency, it is desirable that the time taken to make or to break the connection is as short as possible and this is particularly important in applications involving nuclear radiation in order to minimise the radiation dose received by the person making or breaking the connection.

Accordingly, a connecting assembly of the present invention may be for connecting together a first plurality of tubular members having parallel longitudinal axes and a second plurality of tubular members having parallel longitudinal axes which connector comprises:

(i) a plurality of connectors of the invention each having a first tubular socket at its second end, each of the first tubular sockets having parallel longitudinal axes and being adapted to receive the first plurality of tubular members and each of the second tubular sockets having parallel longitudinal axes and being adapted to receive the second plurality of tubular members so that each tubular socket accommodates one of the tubular members wherein (ii) said connectors are connected together, (iii) each tubular socket includes a circumferentially extending housing, of increased outer dimension compared to the outer dimension of the remainder of the socket, to accommodate a sealing member to provide a fluid tight joint between the socket and the tubular member accommodated therein, (iv) the housing of each of the first tubular sockets is axially staggered with respect to the housing of the first tubular socket adjacent thereto, and (v) the housing of each of the second tubular sockets is axially staggered with respect to the housing of the second tubular socket adjacent thereto.

By arranging for the housings of adjacent sockets to be staggered, the connectors can be arranged closer together so that the distance between the longitudinal axes of adjacent connectors can be minimised.

The connectors of the assembly may be arranged in a row with their first tubular sockets disposed laterally of one another and with their second tubular sockets disposed laterally of one another. If desired, the connection assembly may include more than one row of connectors superposed on each other. In this case, it is preferred for the connectors of adjacent superposed rows to be staggered so as to reduce the spacing between the connectors of adjacent rows.

Instead of providing all of the connectors with securing means, it may be sufficient to mechanically secure the plurality of tubular members together to form an assembly, by means of, for example, a strap. In this case, only selected coupling members, for example those at the extremities of the assembly, may need to be fitted with first and second securing members.

In use, it is merely necessary to push the first plurality of tubular members into the first tubular sockets of the coupling members and to push the second plurality of tubular members into the second tubular sockets of the coupling members. Preferably, each coupling member includes, between its first and second ends, a region of reduced dimension to act as a stop when the tubular members are pushed into the coupling member. It is also preferred for an end of each coupling member to terminate in a first plane and the other ends of the coupling member to terminate in a second plane. In this way, the introduction of the tubular members into the sockets at the ends of the coupling members is facilitated.

BRIEF DESCRIPTION OF THE DRAWINGS

The present invention will be further described, by way of examples only, with reference to the accompanying drawings, in which.

DETAILED DESCRIPTION OF THE SPECIFIC EMBODIMENTS

Figure 1:
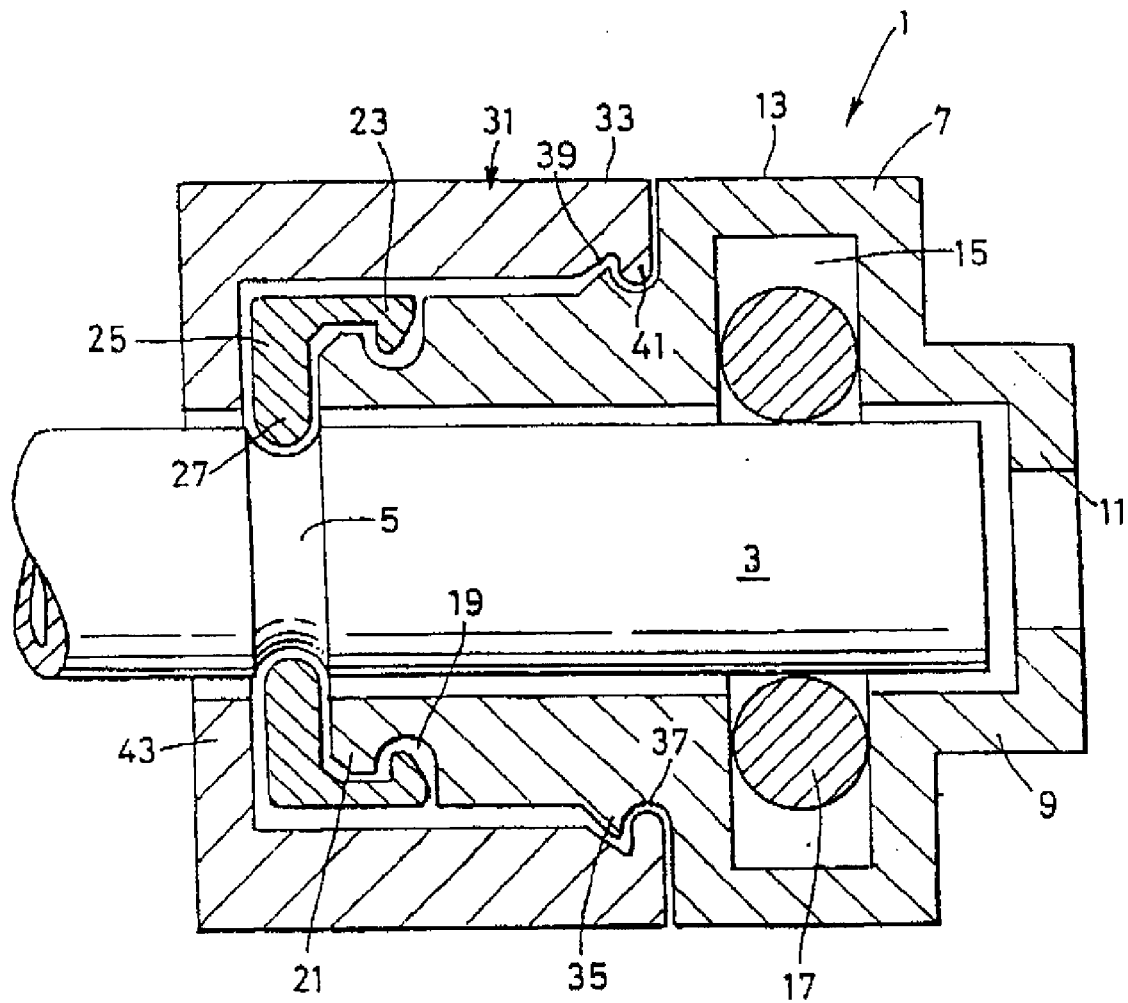
Figure 2:
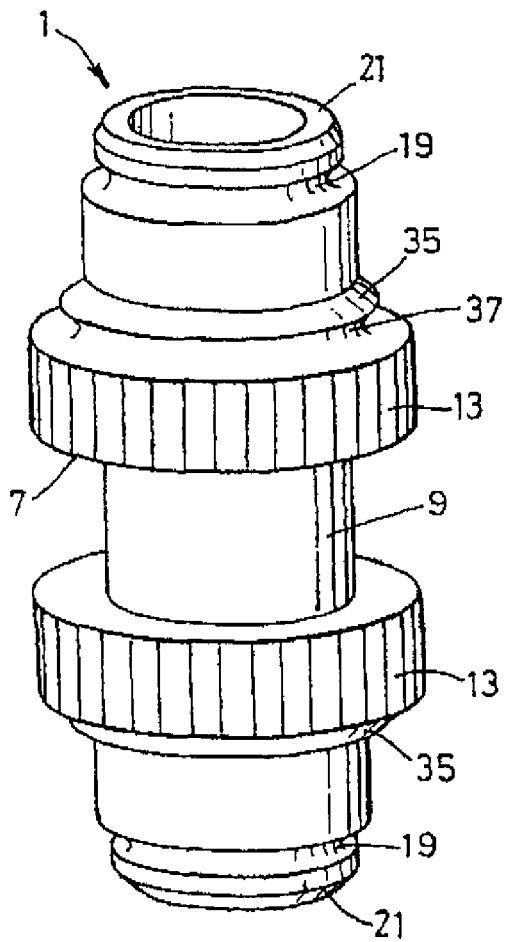
Figure 4:
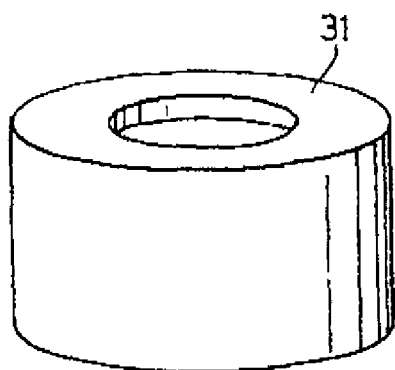
FIG. 4 shows one of the locking covers or collars used with the coupling.
Figure 3:
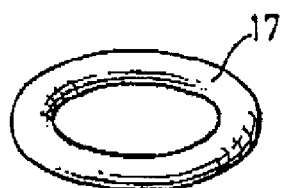
FIG. 3 shows an 'O' ring forming part of the coupling.
Figure 5:
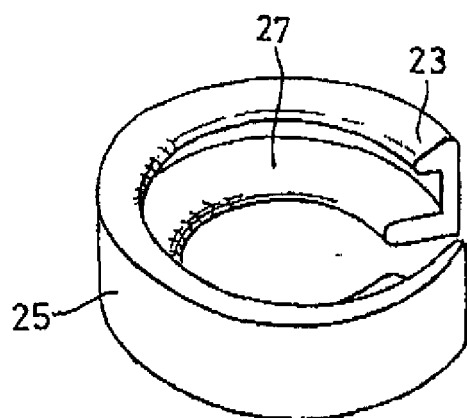

Referring to FIGS. 1 to 5 of the accompanying drawings, a pipe connector 1 in accordance with the present invention is in the form of a straight coupling and connects together two pipe ends, one of which 3 is shown in FIG. 1. As illustrated in FIG. 1, pipe end 3 includes an external peripheral groove 5 located some distance from the very end of pipe end 3.

Figure 1A:
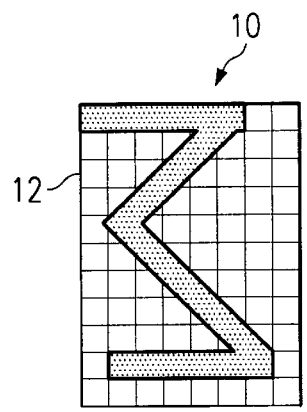
FIG. 1 shows, in longitudinal section, one half of a straight coupling of the present invention in place around a pipe end.
Figure 1B:
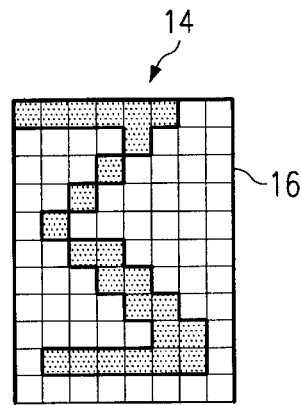
Figure 2:
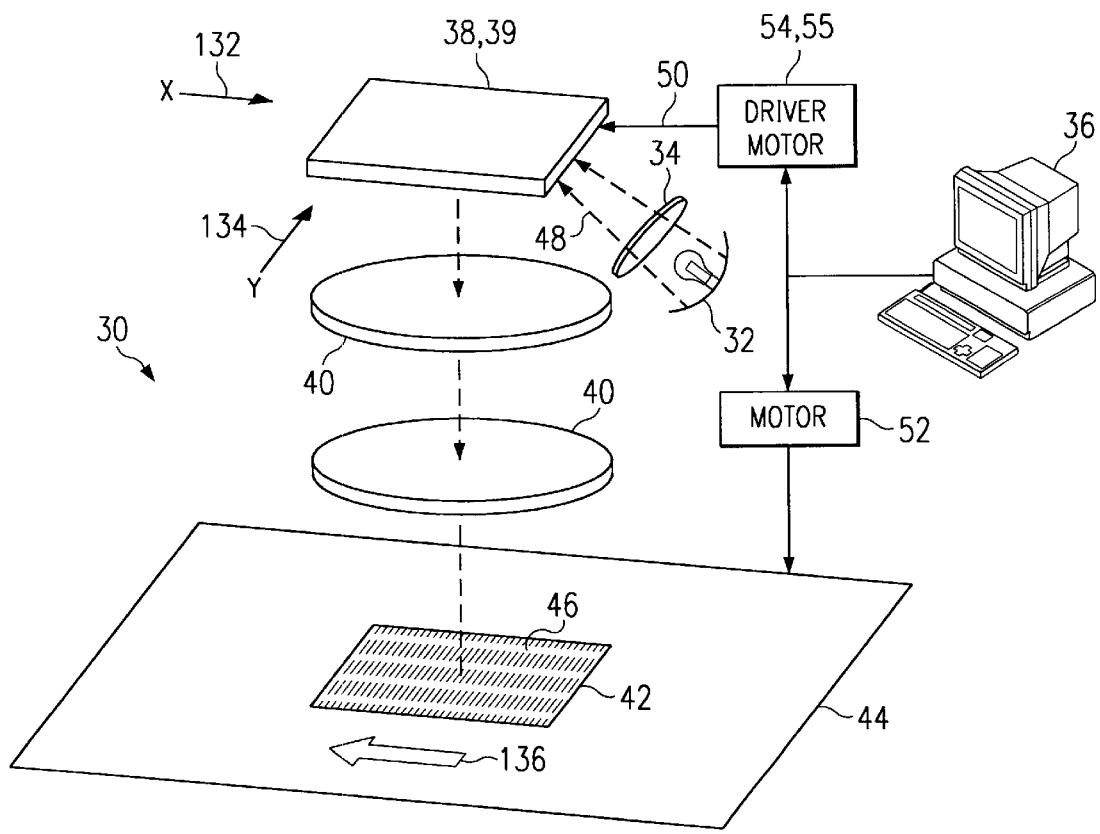
FIG. 2 is an external view of the main body of the coupling which is partly illustrated in FIG. 1.
Figure 5:
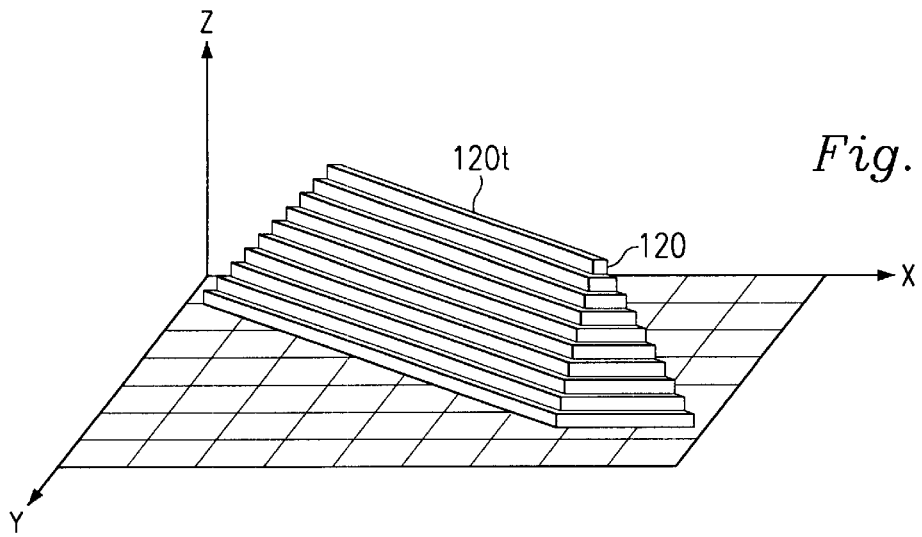
FIG. 5 shows one of the split rings forming part of the coupling.
Figure 6A:
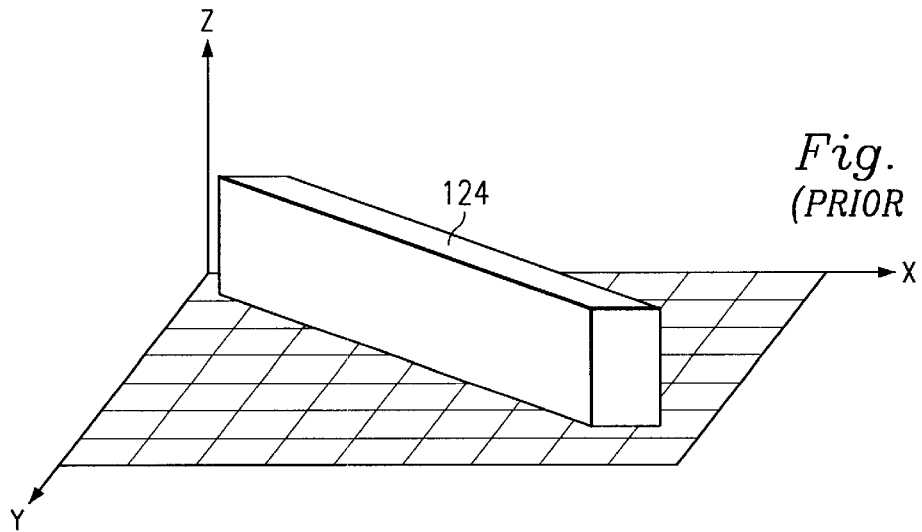
FIG. 6 shows an alternative split ring.
Figure 6B:
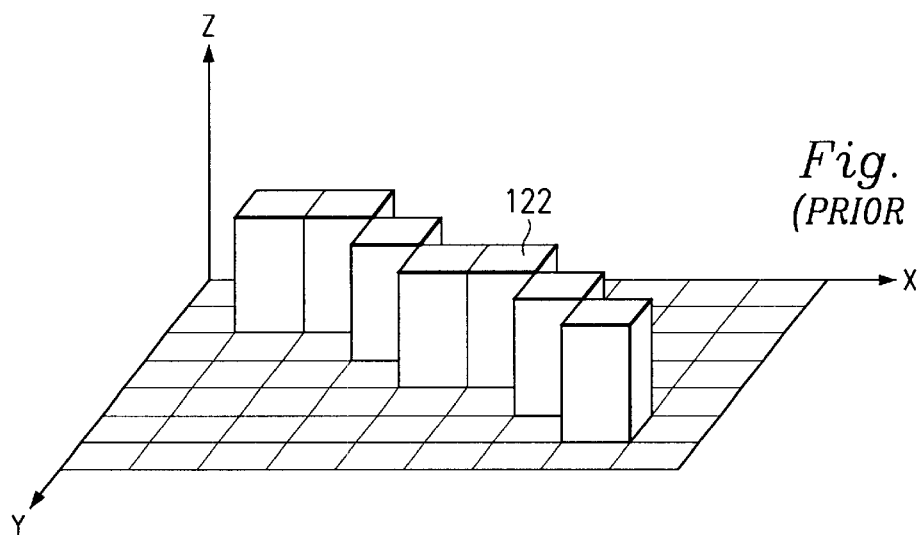

As best seen in FIG. 2, connector 1 includes a connector body which is in the form of a substantially cylindrical sleeve 7 for extension between and about two pipe ends arranged in end-to-end relationship.

Only half of the sleeve is shown in FIG. 1 in order to illustrate the engagement of the connector 1 with one of the pipe ends 3. The other half of sleeve 7 is a mirror image of the half shown in FIG. 1 about a plane, transverse to the sleeve and located at the left hand side of FIG. 1.

The middle portion 9 of sleeve 7 includes inwardly extending flange 11, against which the pipe ends are abutted. Spaced from flange 11 are peripheral projections 13 which provide internal recesses 15, each of which is for housing an 'O' ring 17. These 'O' rings seal the connector to each of the pipe ends 3.

Located adjacent each end of sleeve 7 is an external annular groove 19. This groove 19 is separated from the adjacent end of sleeve 7 by means of annular lip 21 whose outer diameter is somewhat less than that of the sleeve on the other side of annular groove 19.

Groove 19 is for accommodating an internally directed annular flange 23 of split ring 25. A longer annular flange 27 extends about the end edge of sleeve 7 and radially inwardly beyond sleeve 7. The inner end of flange 27 locates in groove 5 of pipe end 3.

The split ring 25 is held in the position illustrated in FIG. 1 by means of a locking cover or collar 31. Cover 31 includes a circular cylindrical wall 33 extending from split ring 25 up to projection 13. Adjacent projection 13, sleeve 7 is formed with a radially outwardly directed rib 35 which provides an annular groove 37. Cover 31 is provided with a correspondingly profiled groove 39 and rib 41 which enable the cover 31 to be located onto sleeve 7.

Sleeve 7 is provided with a radially inwardly directed flange 43 at that end removed from rib 41 which flange serves to conceal the split ring 25 and enables the connector to have a pleasing external appearance.

In order to use the above described connector to connect together two pipe ends, each pipe end is first pushed into sleeve 7, the sleeve carrying two 'O' rings, until the very end of each pipe abuts flange 11. Then the split rings 25 are inserted about the ends of sleeve 7 and into engagement with grooves 5. Finally the locking covers 31 are pushed over the ends of the sleeve until there is locking engagement between ribs 41 of locking covers 31 and grooves 37 of sleeve 7. As a result, there is locking engagement between the connector and each pipe end. Accordingly, the connection between the connector and a pipe end is achieved by simple push/fit operation.

Figure 7:
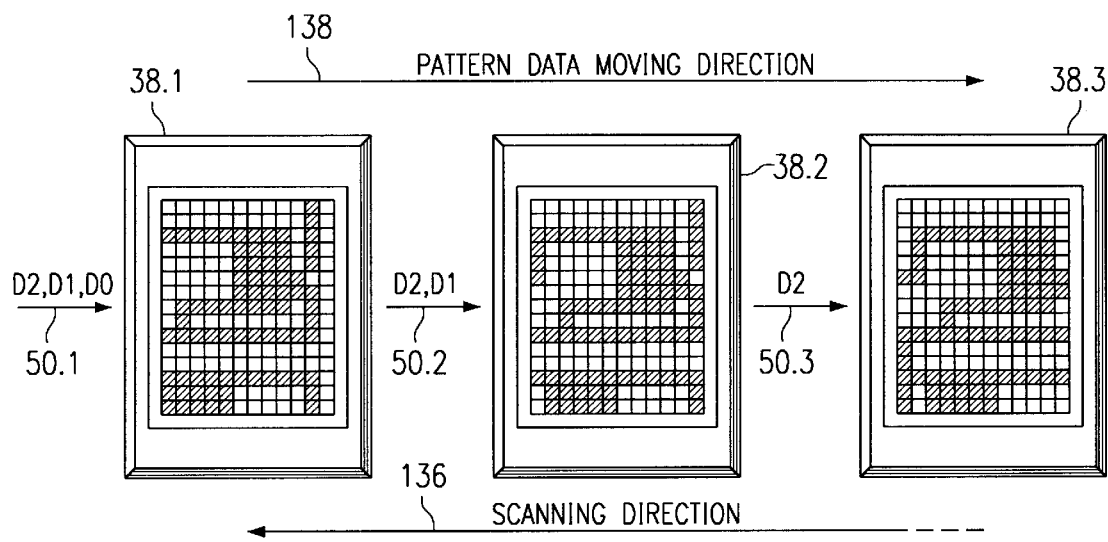
FIG. 7 is a section through the split ring of FIG. 6.
Figure 6:
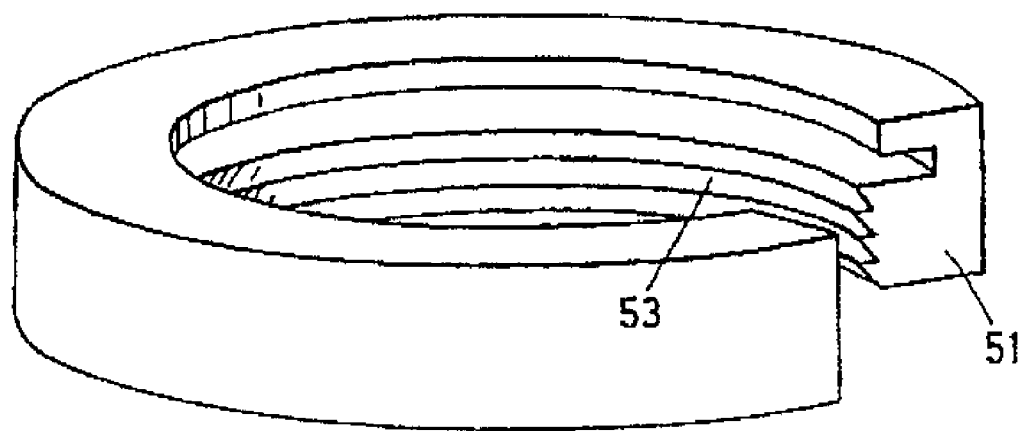
Figure 7:
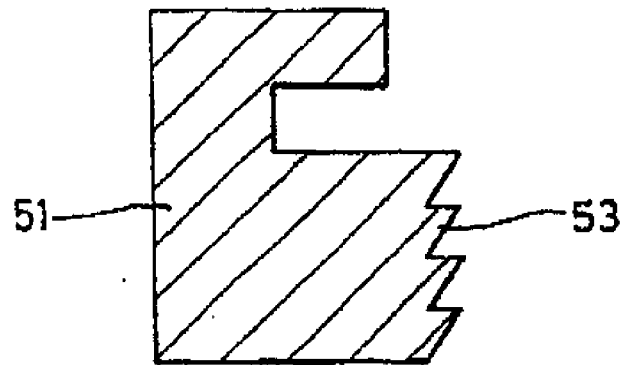
Figure 8:
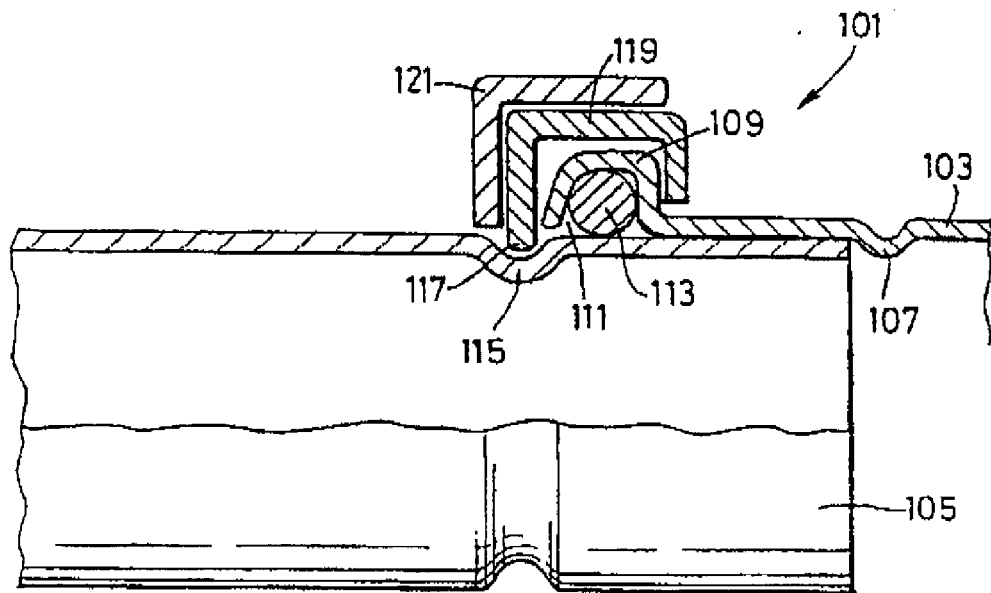
Figure 9:
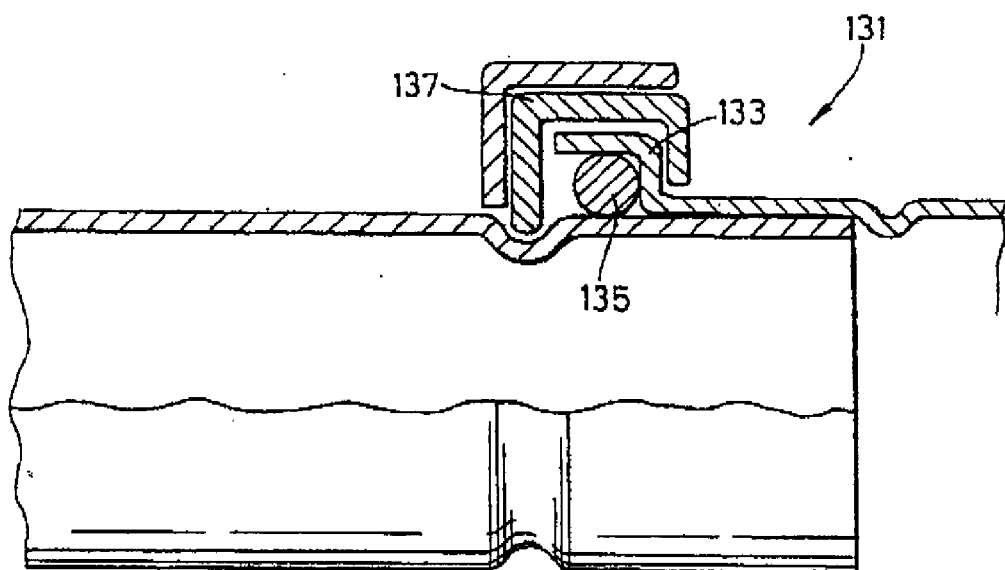

Referring now to FIGS. 6 and 7, a pipe connector is as described above but makes use of a split ring having a somewhat different design. The larger flange 27 of split ring 25 is replaced by relatively thick (in the longitudinal direction) flange 51 which is provided with a plurality of inwardly directed ribs 53. In this case, there is no requirement for the pipe ends to be provided with grooves. Instead the flange 51 acts as a gripping element and can be used with an unmodified pipe end.

The above described connectors, and, indeed, other connectors of the present invention, may be made of any suitable materials. For instance, the main body and the locking cover may be made of a suitable hard plastics material. The 'O' rings may be made of an appropriate resilient rubber of polymeric material and the split ring may be made of a suitable compressible or resilient plastics material. However other appropriate materials may be used.

Figure 8:
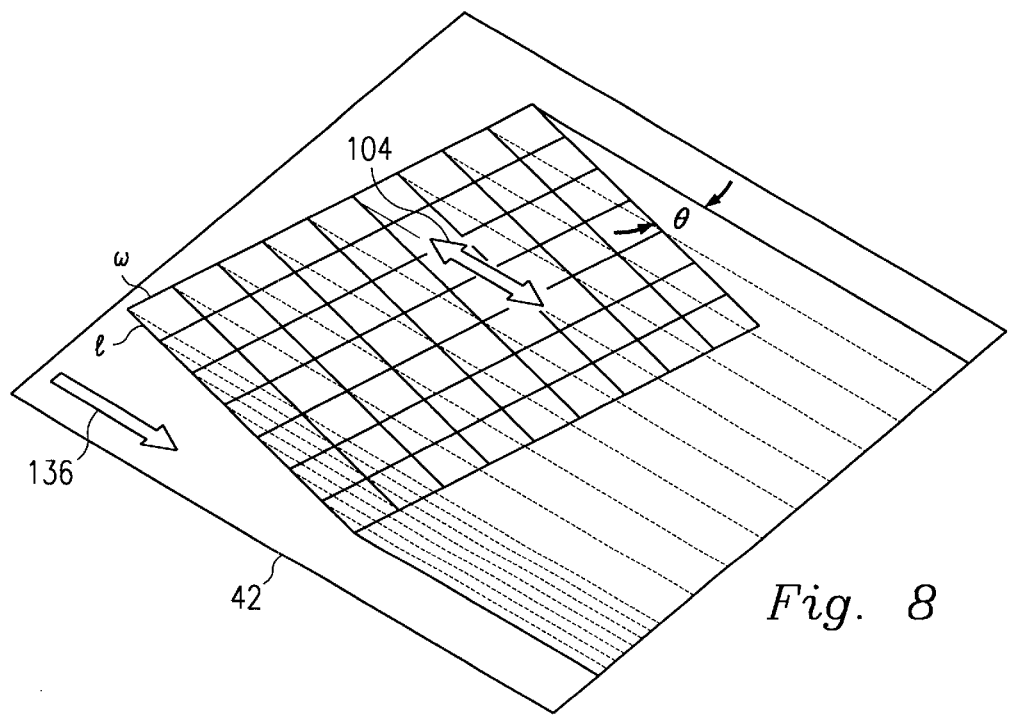
FIG. 8 illustrates, in longitudinal section, part of another straight coupling of the present invention.

Referring to FIG. 8 of the accompanying drawings, there is illustrated a longitudinal section through part of a straight coupling 101 of the present invention. Pipe connector 101 includes a connector body which is in the form of a substantially cylindrical sleeve 103 for extension between and about two pipe ends, one of which 105 is shown in FIG. 8. The two pipe ends are arranged in end-to-end relationship. Sleeve 103 includes a centrally located, radially inwardly directed rib 107 against which the pipe ends are abutted. At each of its free ends sleeve 103 includes an integral, outwardly projecting collar 109 providing an internal recess 111 which houses an open 'O' ring 113. These 'O' rings 113 seal the connector 101 to each of the pipe ends 105.

Pipe end 105 is provided with a radially inwardly directed groove 115 located just beyond the end of sleeve 103. This radial groove 115 is for accommodating an inner edge 117 of a split locking clamp 119. Locking clamp 119 is of broadly channel-shaped cross section with one wall of the channel being of lesser height than the other. This arrangement enables the locking clamp 119 to be arranged with edge 117 located in groove 115, the clamp surrounding projection 119 and with the lower height wall terminating adjacent the body of sleeve 103.

With the locking clamp 19 in position about the end of sleeve 103, an annular end cover 121 may be slid longitudinally into the position shown in FIG. 8, thereby holding the other components of the connector in the position shown in FIG. 8.

Figure 9:
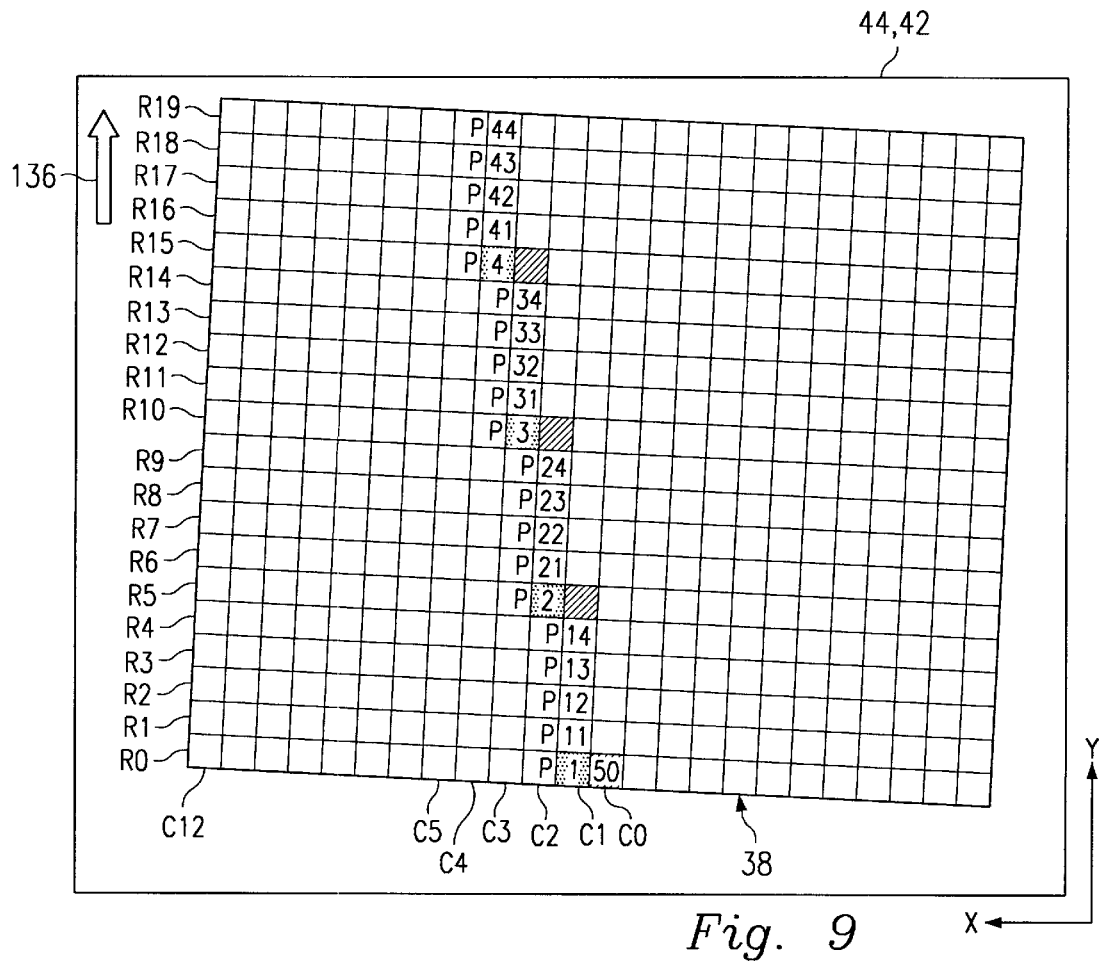
FIG. 9 illustrates, in longitudinal section, part of a further straight coupling of the present invention.

In the embodiment shown in FIG. 8, a connector 131 of the invention is substantially as described above with reference to FIG. 8. However, in this case, the end projections of the sleeve are of substantially L-shaped cross section rather than the approximately U-shaped cross section of the embodiment of FIG. 8. Accordingly, projection 133 of the FIG. 9 embodiment provides a recess for the 'O' ring 135 which is open at the sleeve end, the resultant gap being closed by the locking clamp 137.

Figure 10:
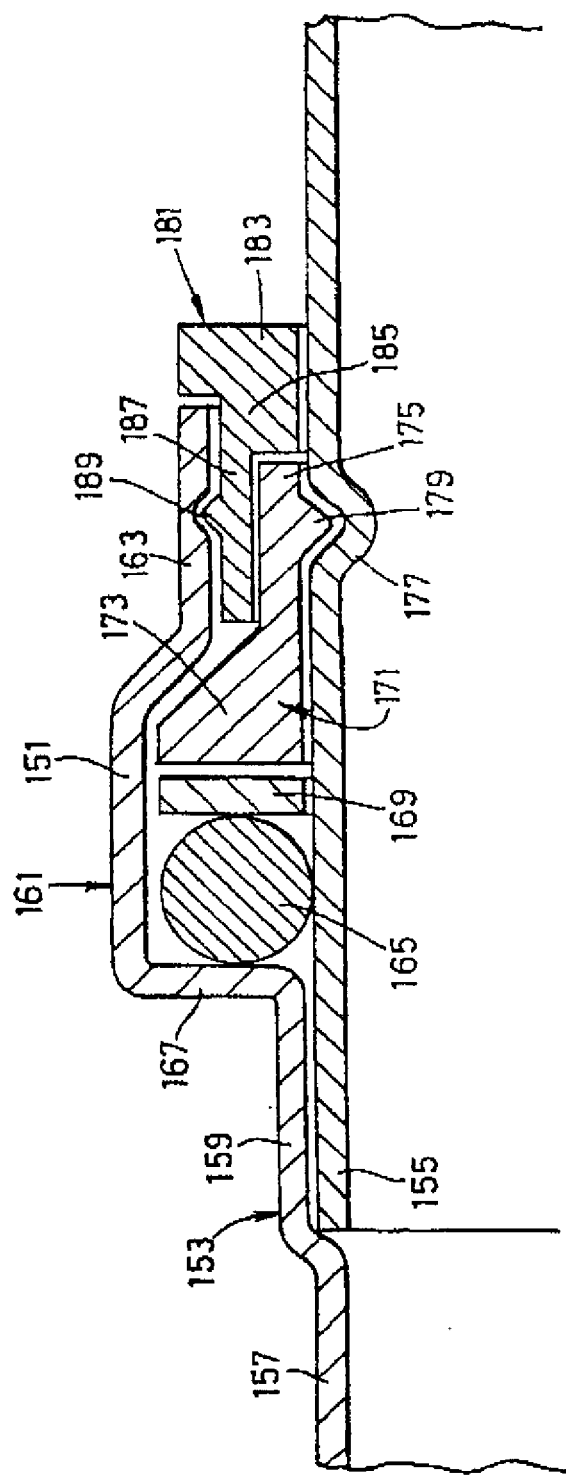
FIG. 10 shows, in longitudinal section, a further embodiment of part of a straight coupling of the present invention.
Figure 12:
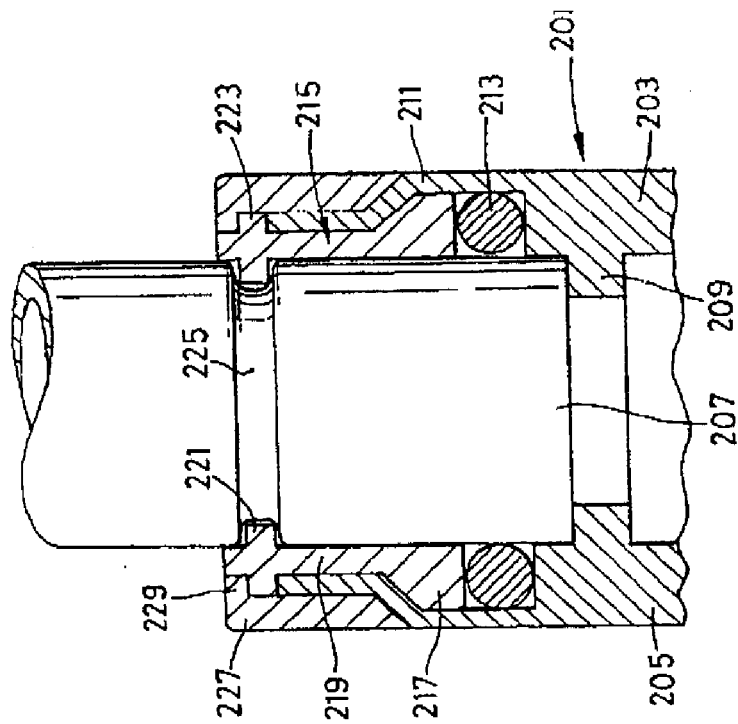
Figure 11:
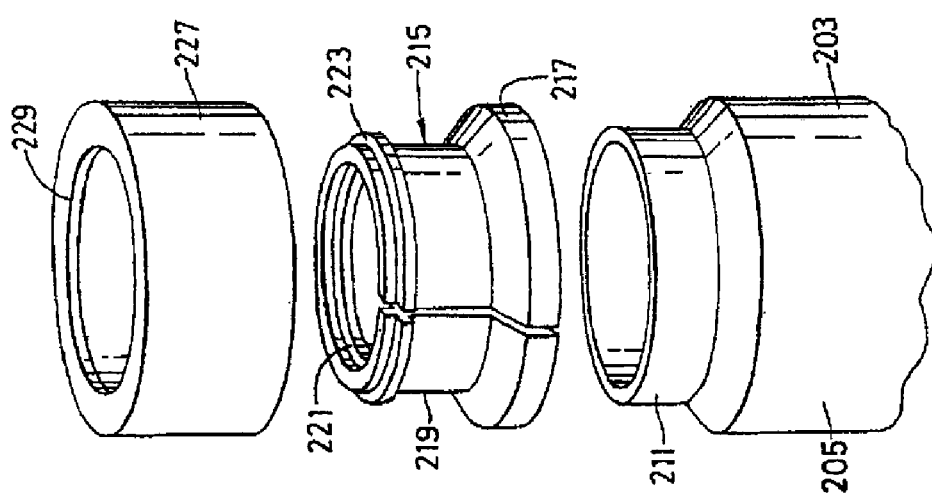
Figure 13:
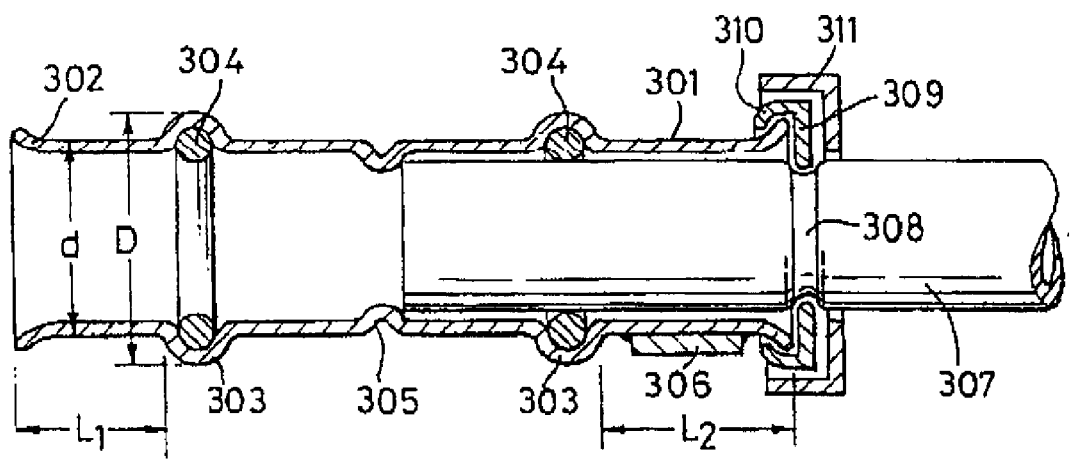
Figure 14:
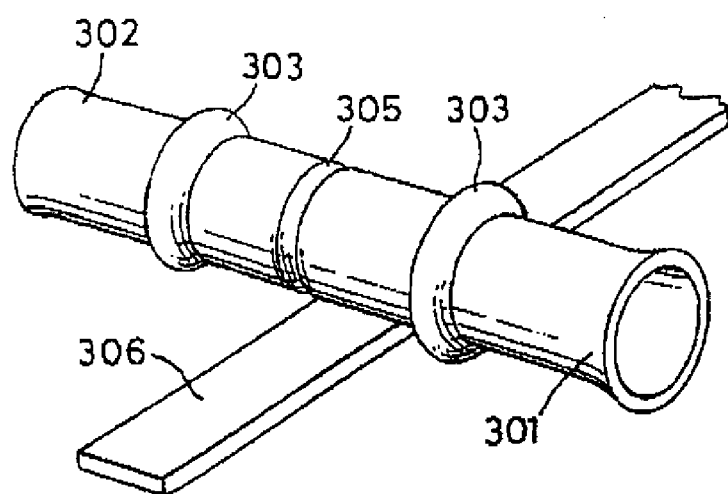

Referring to FIG. 10 of the accompanying drawings, another embodiment of the present invention is shown in part longitudinal section only and includes a straight coupling 151 having a body in the form of a sleeve 153 which is profiled, as indicated in FIG. 10, in order to accommodate a pipe end 155 and elements of connection means, forming part of the coupling, which connect the body of the coupling 151 to the pipe end 155.

Sleeve 153 has a smallest diameter portion 157 which is located centrally and extends, in use, between the two pipes being connected together. Extending longitudinally from portion 157 is a somewhat greater diameter portion 159 which accommodates the very end of pipe end 155. At that end of portion 159 closer to its free end, coupling 151 is stepped outwardly to provide a relatively large diameter portion 161 and then tapers inwardly to provide a portion 163 of intermediate diameter. Lodged between the inner wall of sleeve 153 at portions 161 and 163 and the outer wall of the pipe end 155 are the various elements of the means for connecting the body to the pipe end. Within portion 161 are located a sealing O-ring 165 which abuts against radially outwardly extending portion 167 which interconnects portions 159 and 161. Adjacent O-ring 165 on, that side opposite portion 161 of sleeve 153, is a washer 169.

Adjacent washer 169, on that side opposite O-ring 165, is a split ring 171 which, as illustrated in FIG. 10, is of substantially triangular section 173, adjacent washer 169, and has a relatively thin wall section 175 extending from triangular section 173 in a direction away from washer 169. Section 175 of split ring 171 has, adjacent the free end of section 175, an internally directed circumferential projection 177 which extends into groove 179 located in pipe end 155.

A retaining cap 181 is located at the free end of sleeve 153. Cap 181 includes an enlarged end portion 183 which extends from the outer surface of pipe end 155 to a position level with the outer surface of section 163 of sleeve 153. Adjacent section 183 of cap 181 is a somewhat narrower section 185 which extends from the outer surface of pipe end 155 to the inner surface of section 163 of sleeve 153. Extending from the top part of section 185 in a direction towards washer 165 is a further section 187 which is of relatively narrow thickness and extends between section 175 of split ring 171 and section 163 of sleeve 153.

Section 187 of cap 181 is provided, between its free end and section 185 with an outwardly directed projection 189 which locates within a corresponding recess located in section 163 of sleeve 153.

Split ring 171 has a length and shape which act to stabilize the structure of the coupling against distorting forces which may tend to move the split ring out of its position shown in FIG. 10 and in particular so that projection 177 is no longer located in recess 179, thereby allowing the coupling to become disconnected from the pipe end. As indicated in FIG. 10, the total length of split ring 173 is considerably greater than that required simply to carry projection 177 and in this embodiment the length of split ring 173 is at least half that of the diameter of the pipe end 155. In particular because of the length of split ring 173, any distorting forces applied to the coupling will be highly less likely to result in dislodgement of the split ring from its pipe engaging position shown in FIG. 10.

Figure 12:
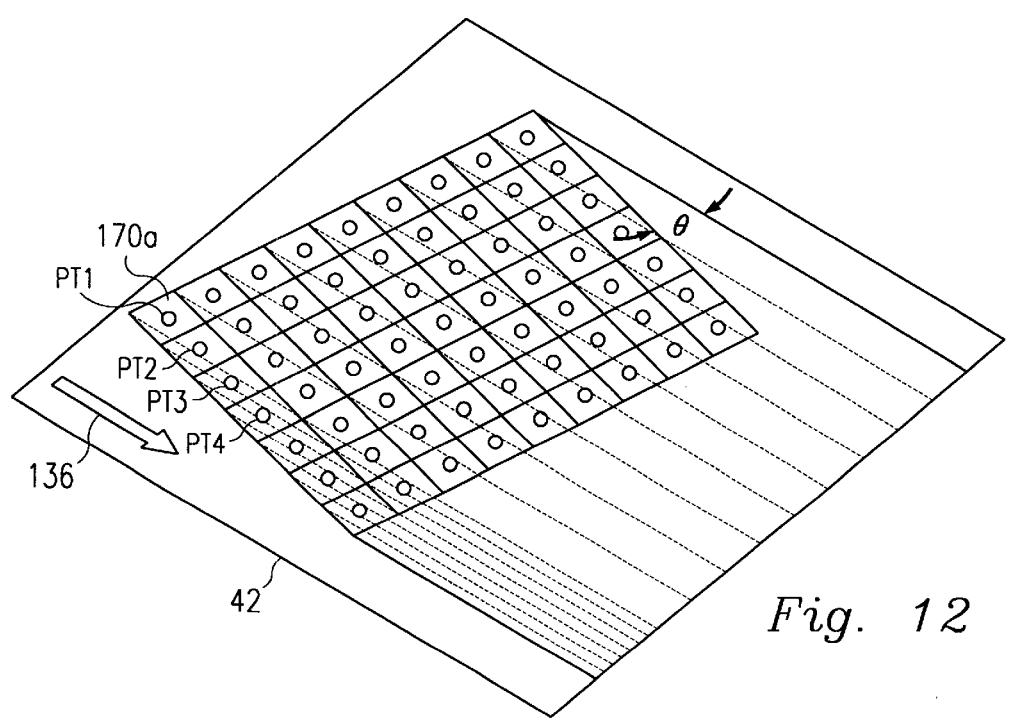
FIG. 12 show the embodiment of FIG. 11 located about a pipe end.
Figure 11:
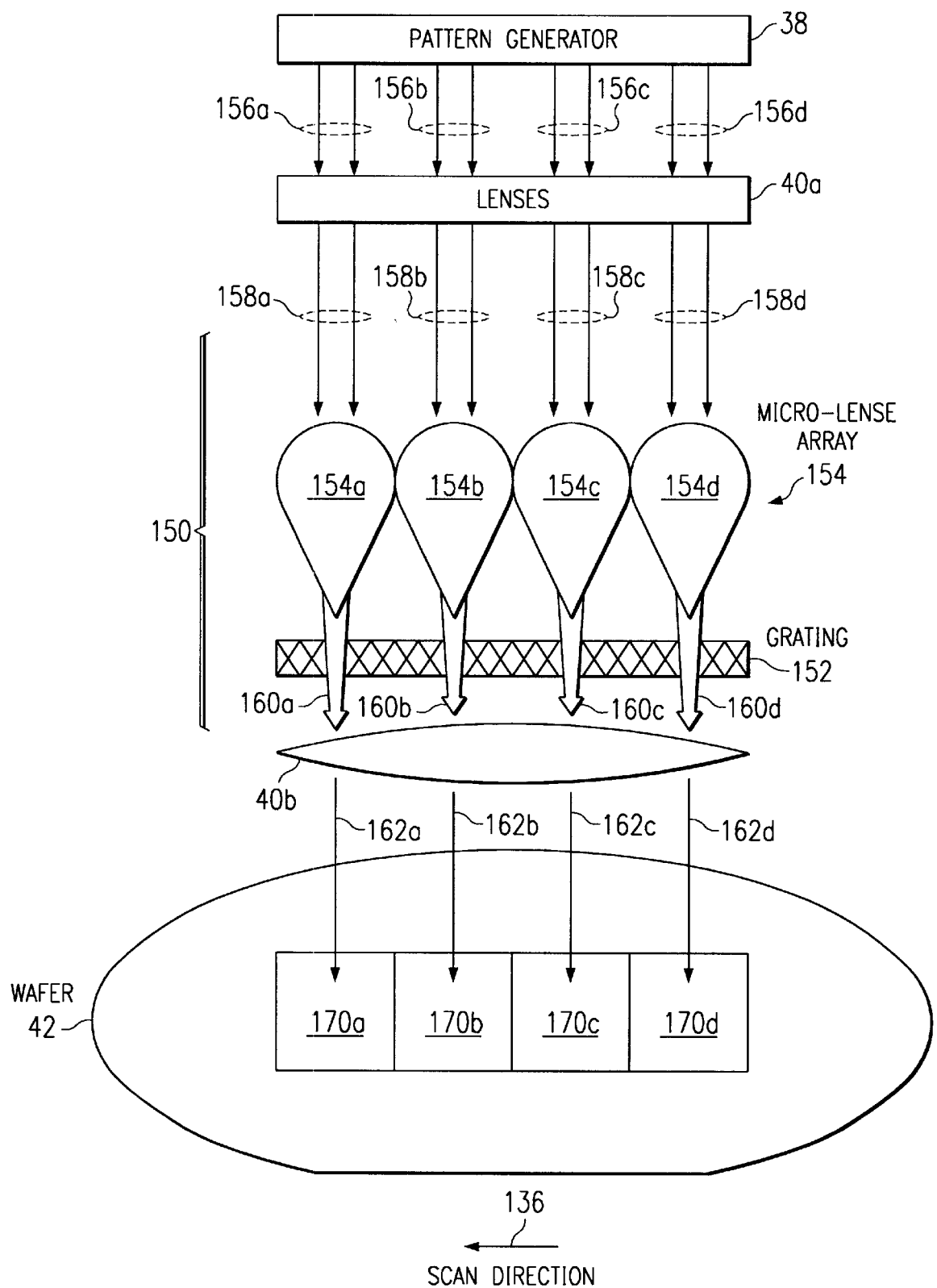
FIG. 11 shows, an exploded perspective view, part of a further embodiment of a straight coupling according to the present invention.

Referring to FIGS. 11 and 12 of the accompanying drawings part of a further embodiment of a coupling in accordance with the present invention is illustrated. The coupling 201 includes a body 203 in the form of a sleeve whose thickness varies along its length. In a central section 205 sleeve 203 is relatively thick and has an inner diameter just greater than the outer diameter of the pipe end 207 which is to be connected to another pipe end (not shown). Extending radially inwardly from section 205 of sleeve 203 is rib 209 against which the pipe ends abut.

Sleeve 203 extends from section 205 to its free end in the form of a relatively thin walled section 211. Adjacent section 205, section 211 is of relatively large diameter and indeed its outside surface is of the same diameter as that of section 205. Section 211 then tapers inwardly in a direction away from section 205 and, between this tapered portion and its free end, section 211 is of relatively narrow diameter.

Section 211 of sleeve 203 contains an O-ring 213 which lies adjacent section 205 and provides sealing between the coupling and the pipe end 207. Between O-ring 213 and the free end of section 211 of sleeve 203 there is accommodated a split ring 215 whose inner diameter corresponds to the outer diameter pipe end 207. Ring 213 is enlarged at one end, the enlargement 217 occupying space between O-ring 213 and the opposite end of the tapered part of section 211. Extending from this enlargement 217 is a relatively thin walled section 219, near the free end of which are inwardly and outwardly extending ribs 211 and 223, both of which extend around the entire periphery of ring 215. Inwardly directed rib 221 locates within a peripherally extending groove 225 of pipe end 207. As indicated in FIG. 12, split ring 215 extends beyond the free end of section 211 of sleeve 203 and this free end of section 211 abuts against outer rib 223 of ring 215.

End cap 227 surrounds part of sleeve 203 and also the end of ring 215 as it emerges from section 211 of sleeve 203. Cap 227 is tapered at one end so that that end fits flush against the outer surface of the tapered part of section 211 of sleeve 203. At its other end cap 227 has a radially inwardly extending flange 229 which abuts against rib 223 of ring 215 on that side opposite to the position of section 211 of sleeve 203.

It can be seen from FIG. 12 that the outer appearance of the coupling is smooth and of constant diameter and hence is of a neat and pleasing appearance. To form a connection between the coupling and a pipe end 207, the end cap 227 is first located over the pipe end. The sleeve 203, which carries with it split ring 215 and O-ring 213, is then pushed over the pipe end. The end of ring 215 which emerges from sleeve 203 is deformed outwardly until inner rib 221 reaches the groove 225 in pipe end 207. Once this position has been reached, end cap 227 is then pushed over ring 215 and sleeve 203 until it reaches the position shown in FIG. 12. The coupling is then locked in position on the pipe end 207.

Figure 13:
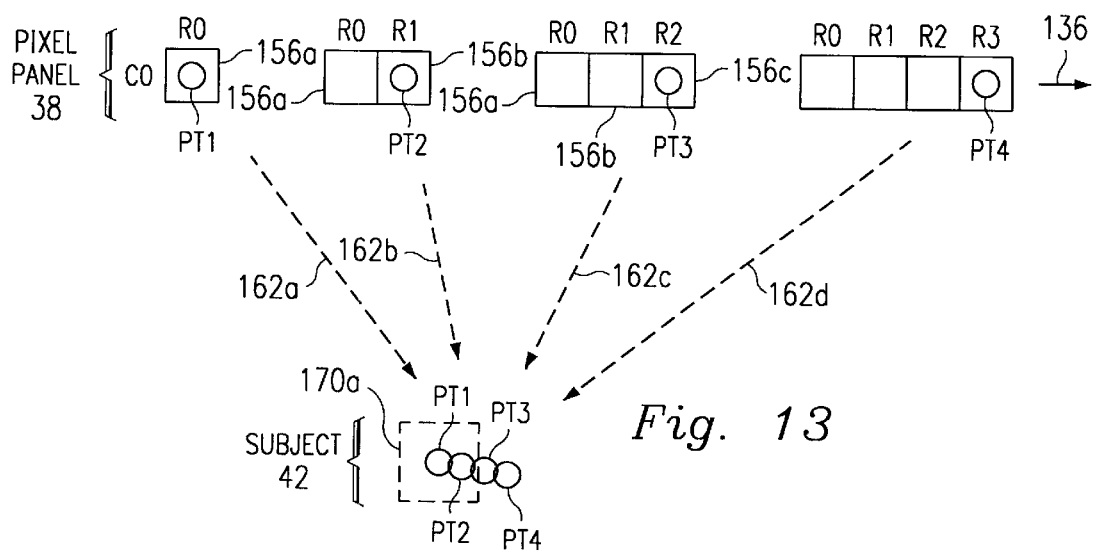
FIG. 13 is a longitudinal section through a further straight coupling in accordance with the present invention.
Figure 14:
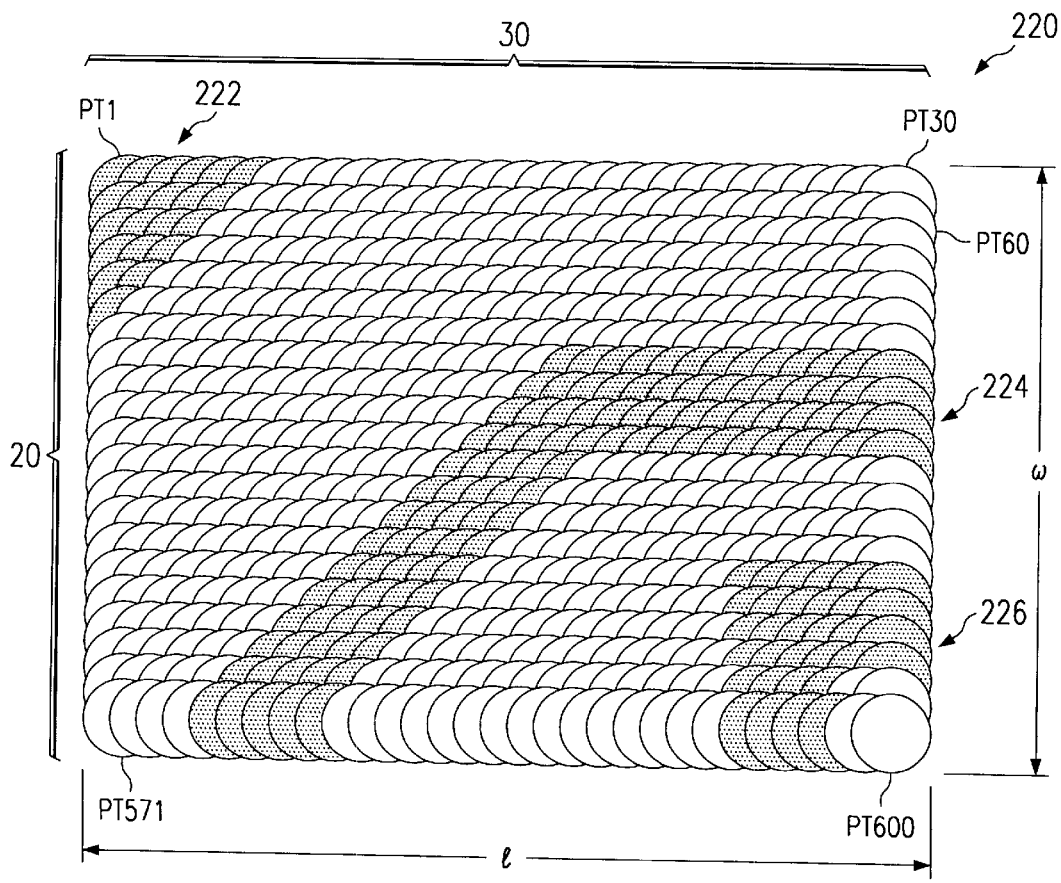
FIG. 14 is a perspective view of the straight coupling of FIG. 13.

Referring now to FIGS. 13 and 14 there is shown a coupling member of generally circular section and formed of stainless steel. The coupling member has a first tubular socket portion 301 at a first end and a second similar tubular socket portion 302 at a second end. Each of the first and second socket portions includes a circumferentially extending housing 303 of outer diameter D which is greater than the outer diameter d of the remainder of the socket position. Located within each housing 303 is a sealing member in the form of an O-ring 304 formed of elastomeric material such as EPDM or PTFE. The distance $L_1$ between the free end of first socket portion 301 and the housing 303 thereof is greater than the distance $L_2$ between the free end of the second socket portion 302 and the housing 303 thereof by a distance equal to or greater than the axial length of the housing 303.

Figure 17:
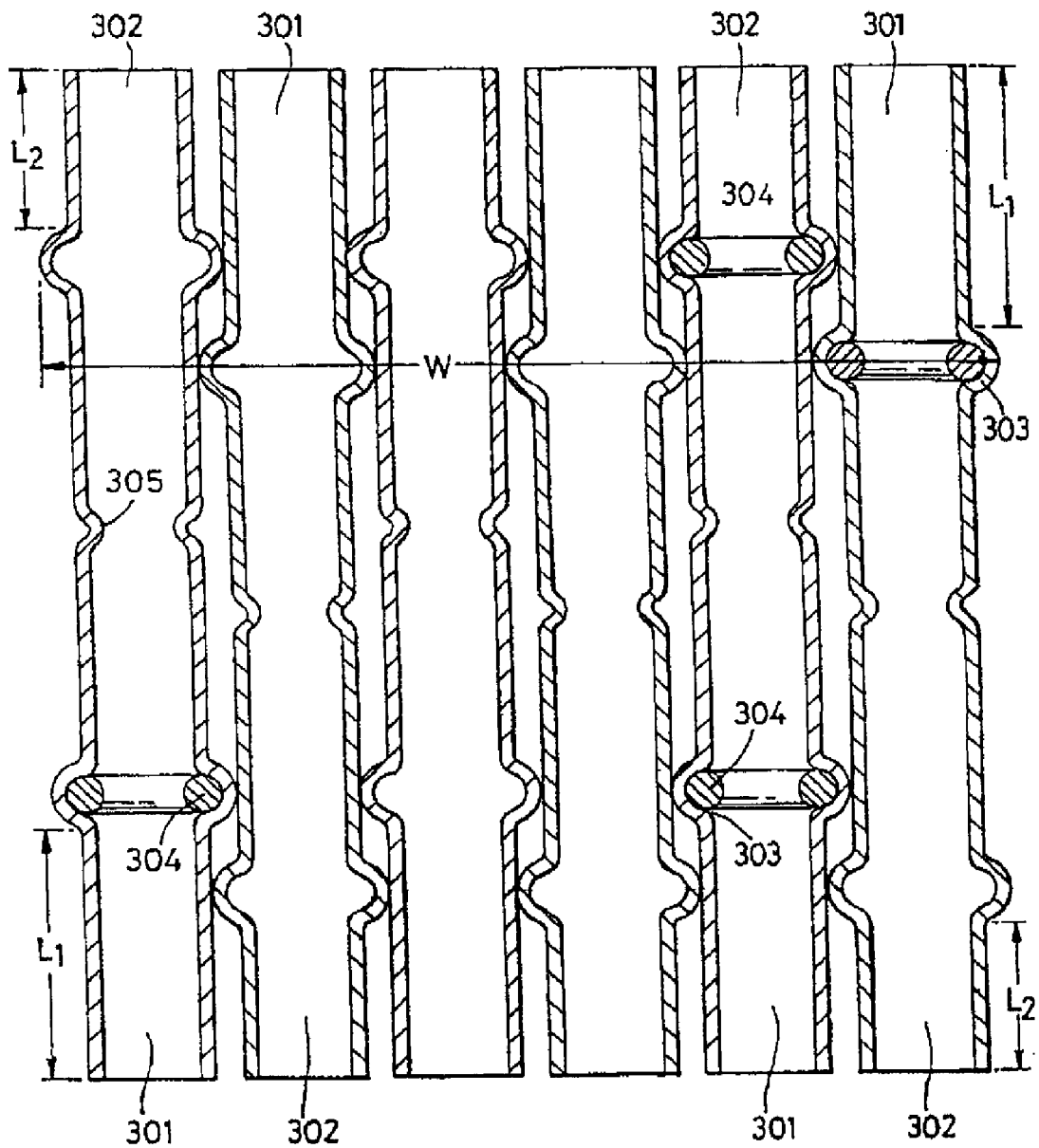
FIG. 17 is a longitudinal section through a further embodiment of the present invention, in this case showing a plurality of straight couplings in a connection assembly.
Figure 1:
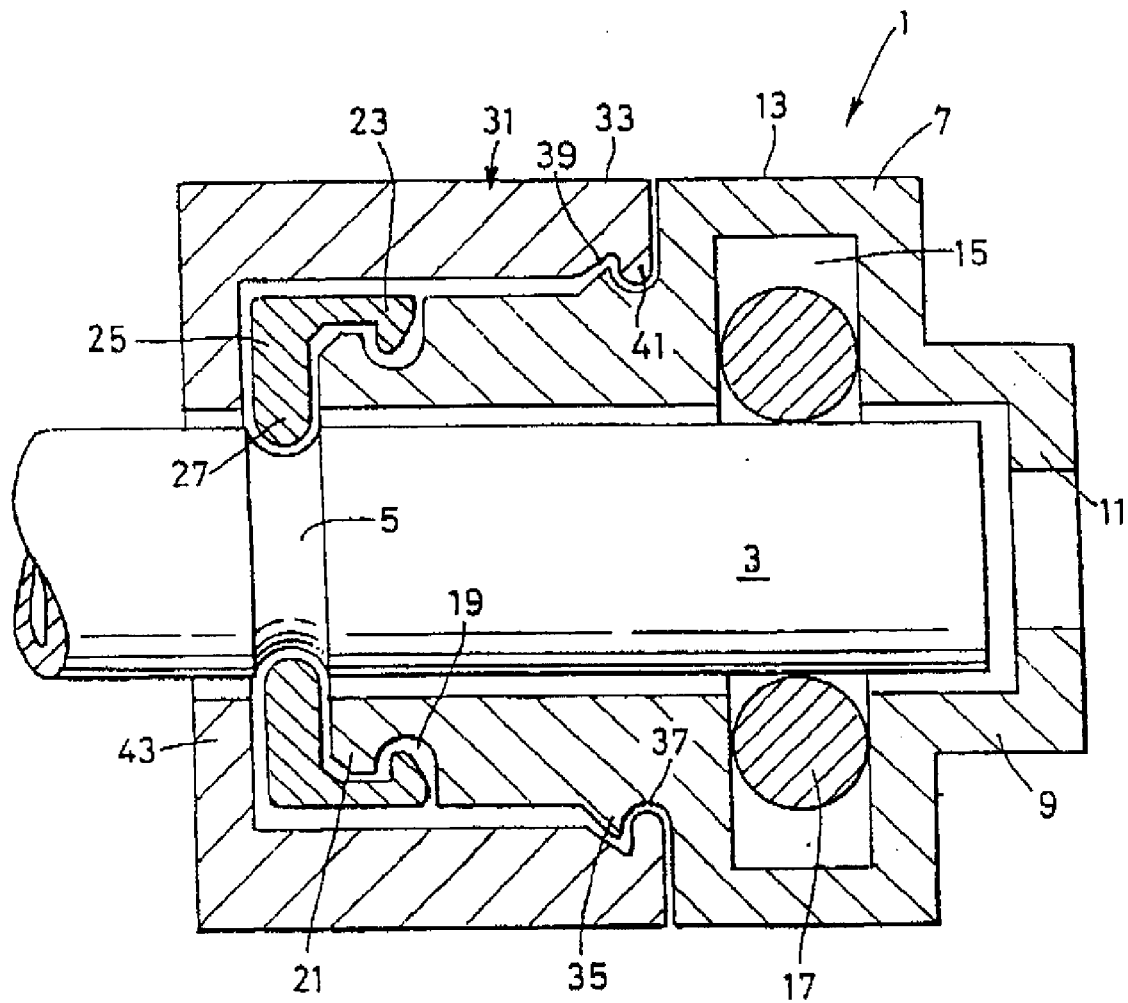
Figure 2:
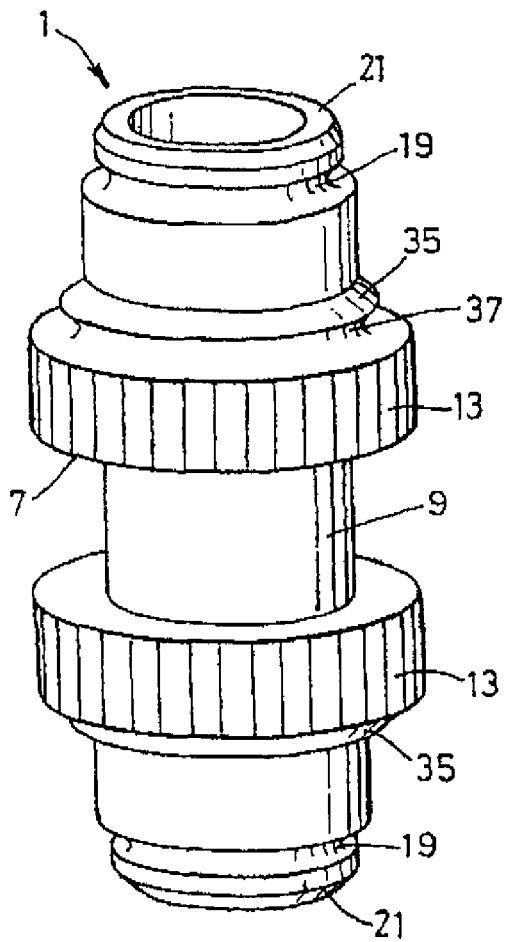
Figure 3:
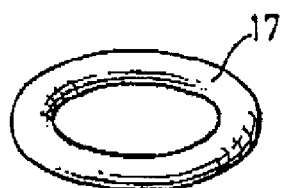
Figure 4:
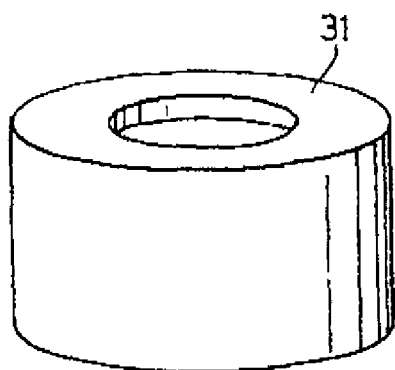
Figure 5:
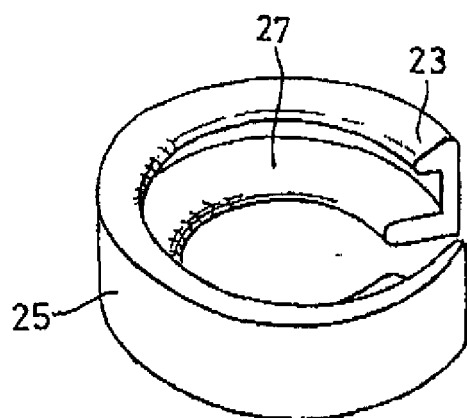
Figure 6:
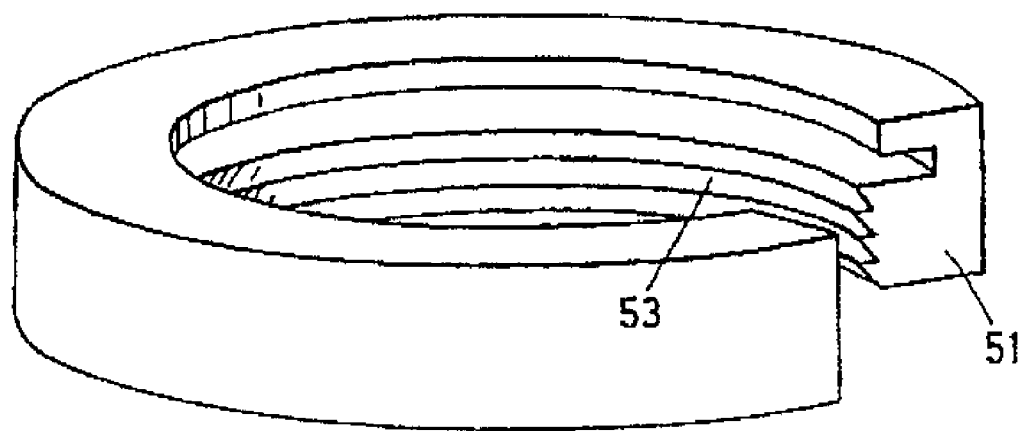
Figure 7:
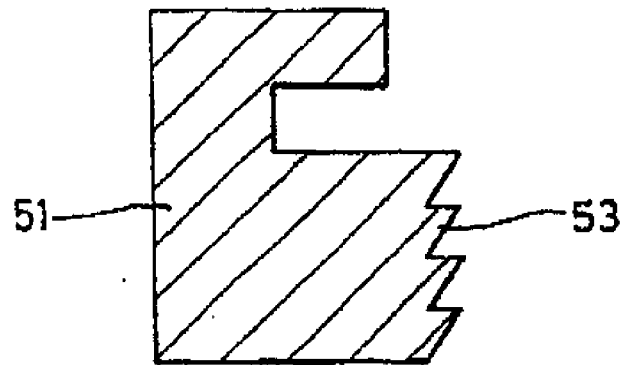
Figure 8:
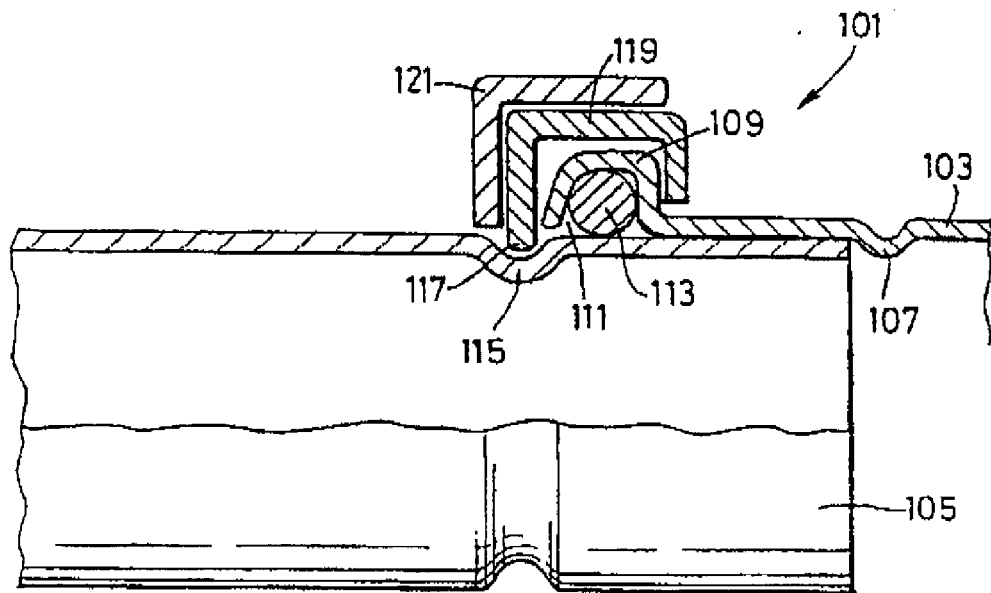
Figure 9:
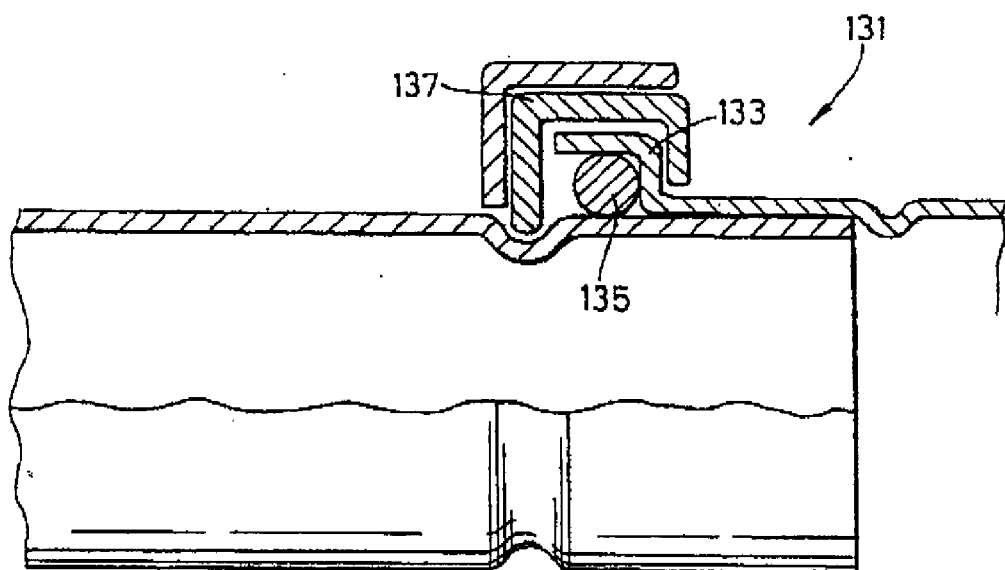
Figure 10:
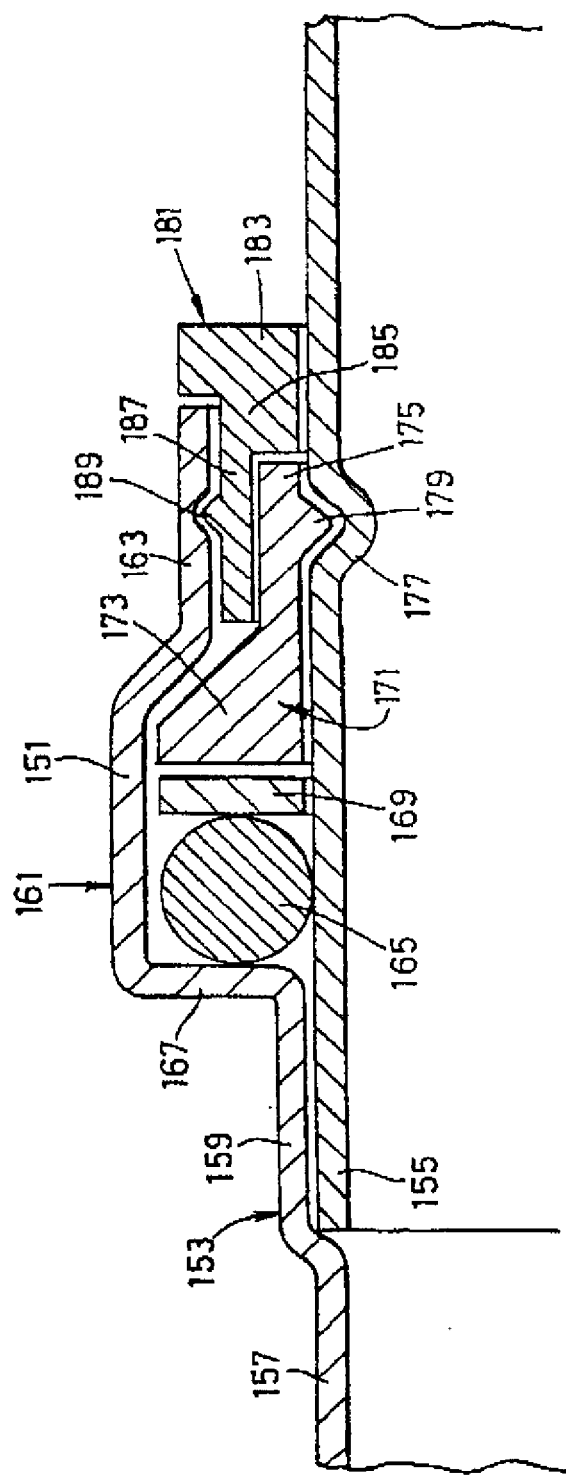
Figure 12:
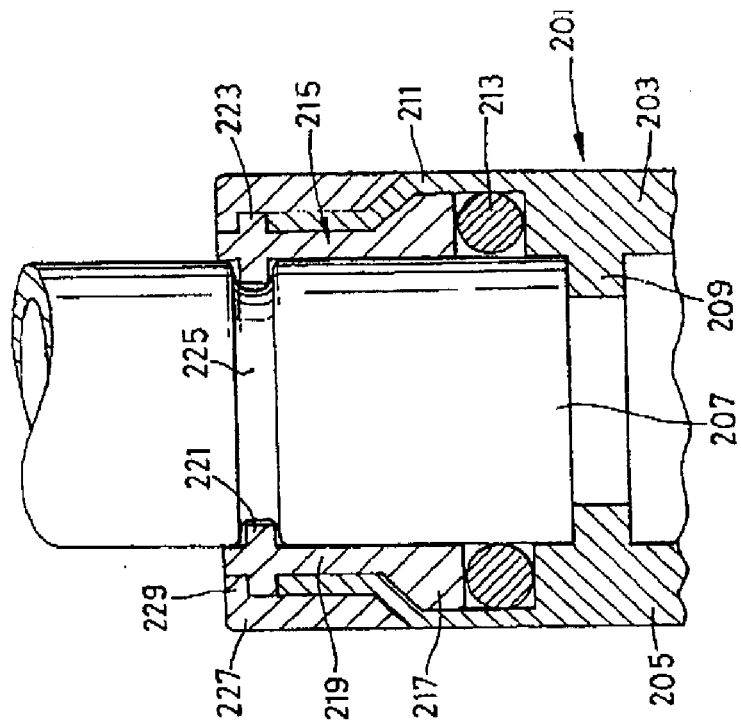
Figure 11:
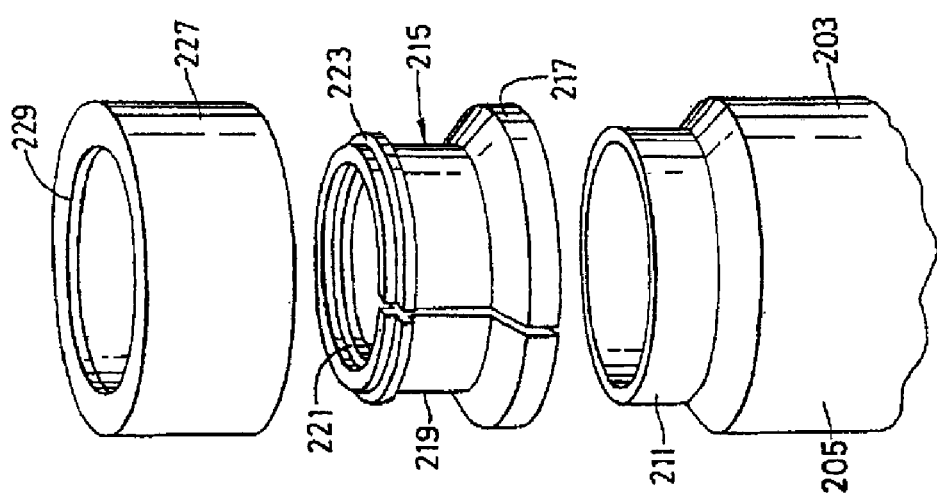
Figure 13:
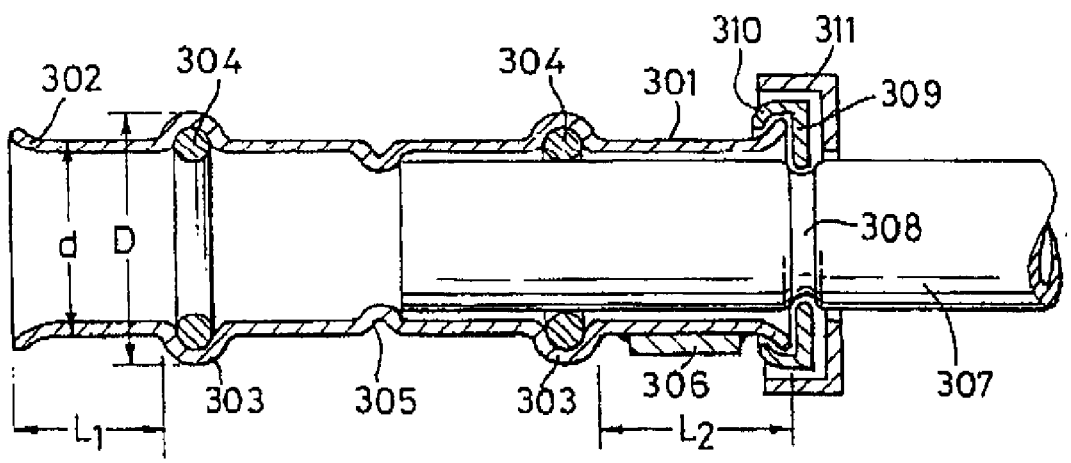
Figure 14:
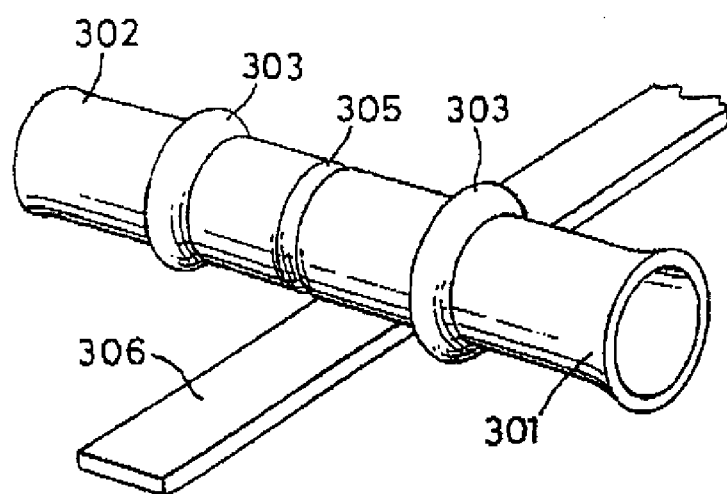
Figure 15:
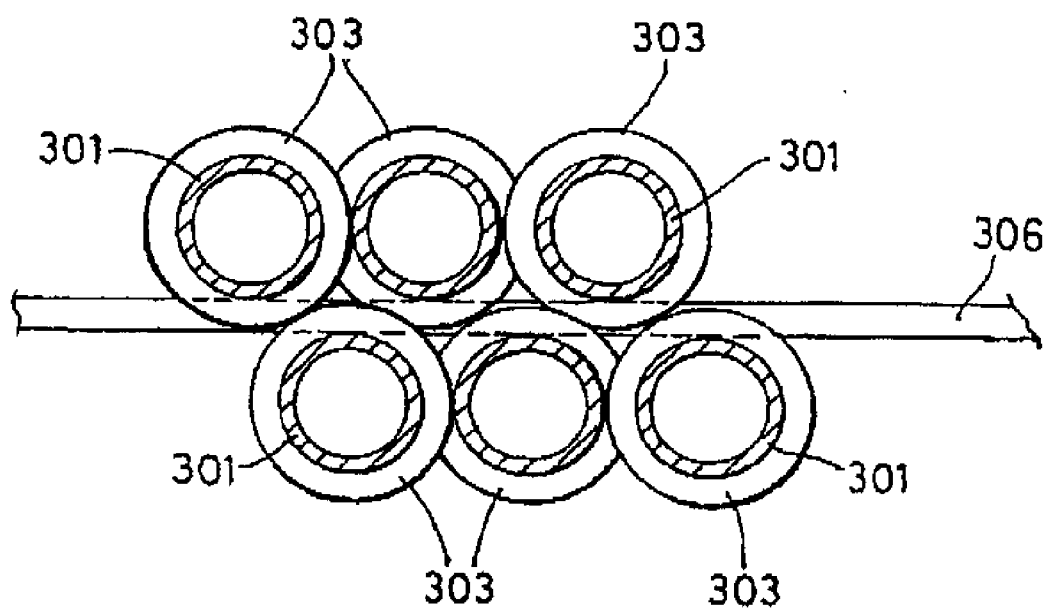
Figure 16:
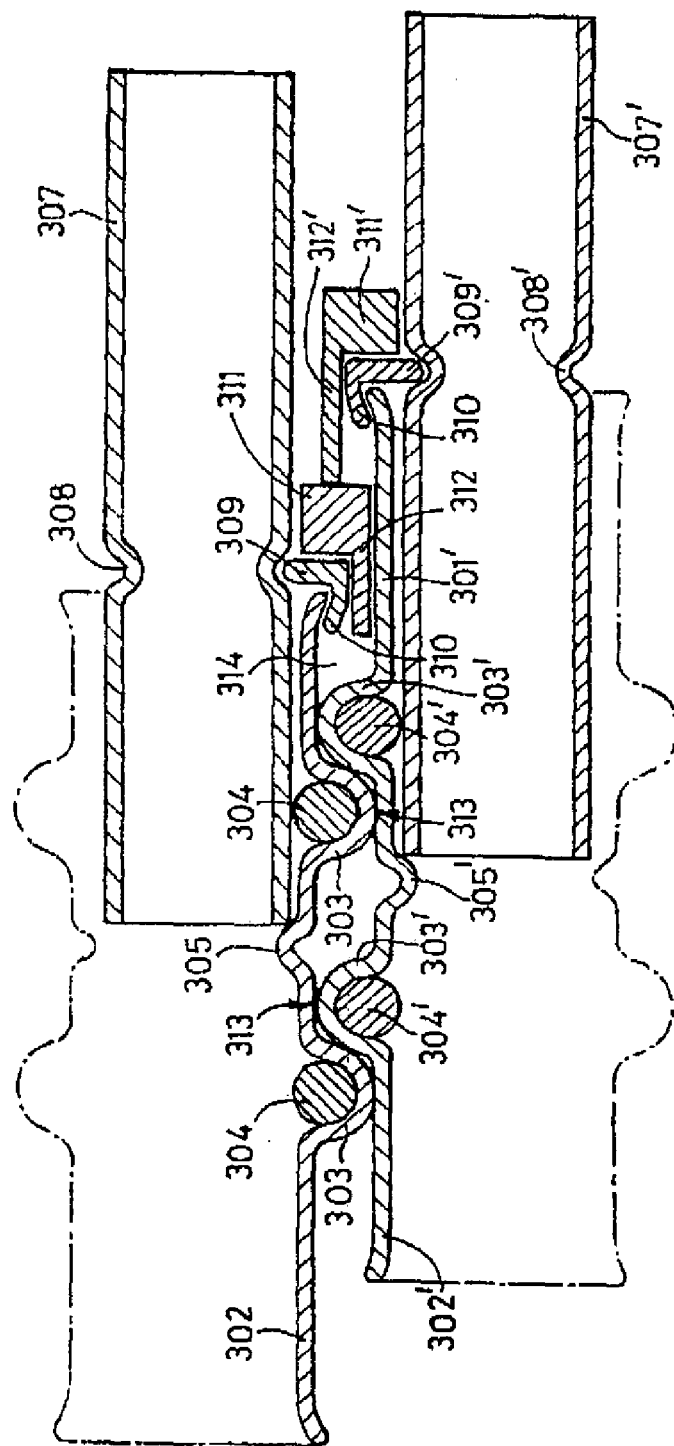
Figure 17:
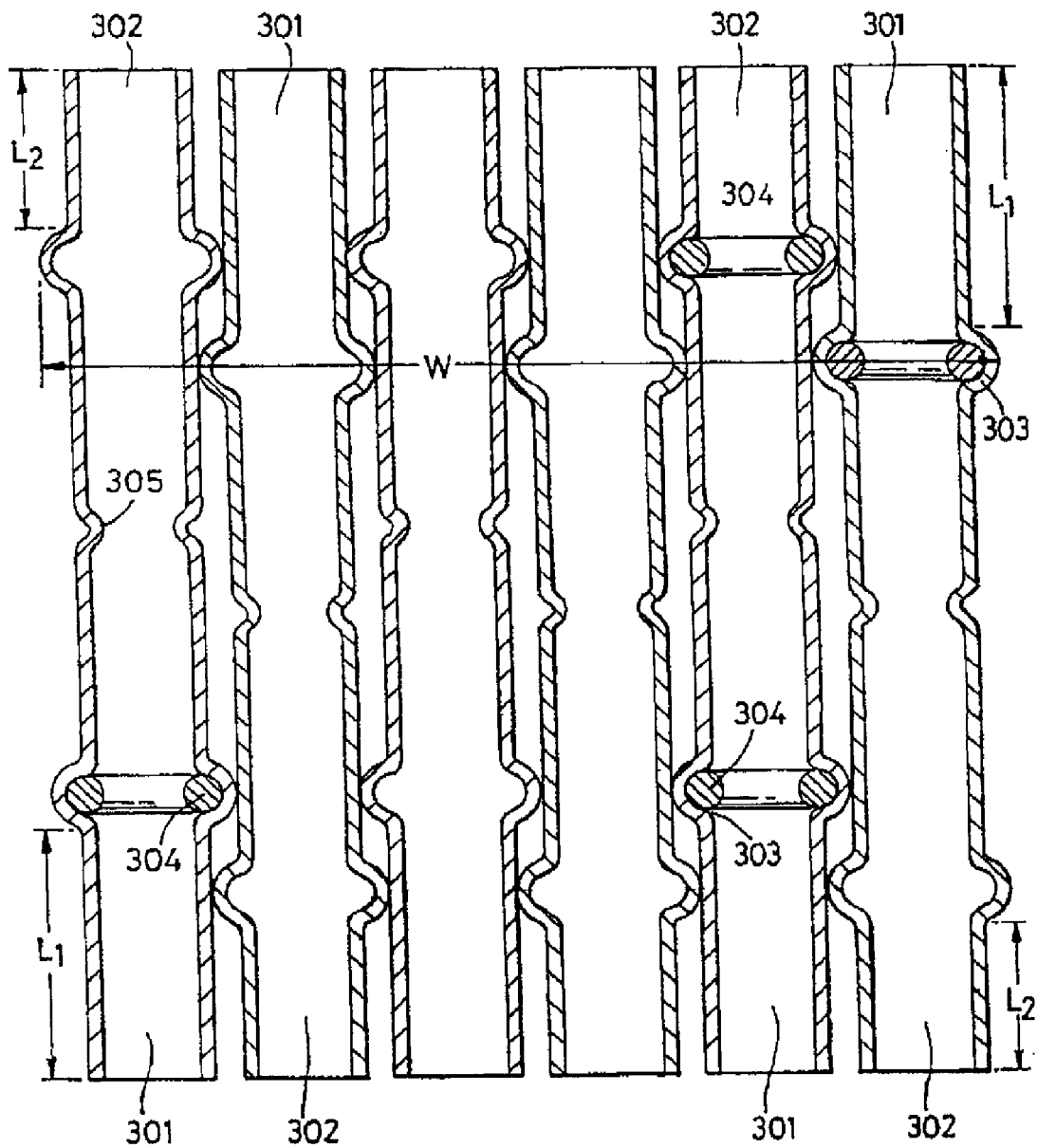
Figure 1:
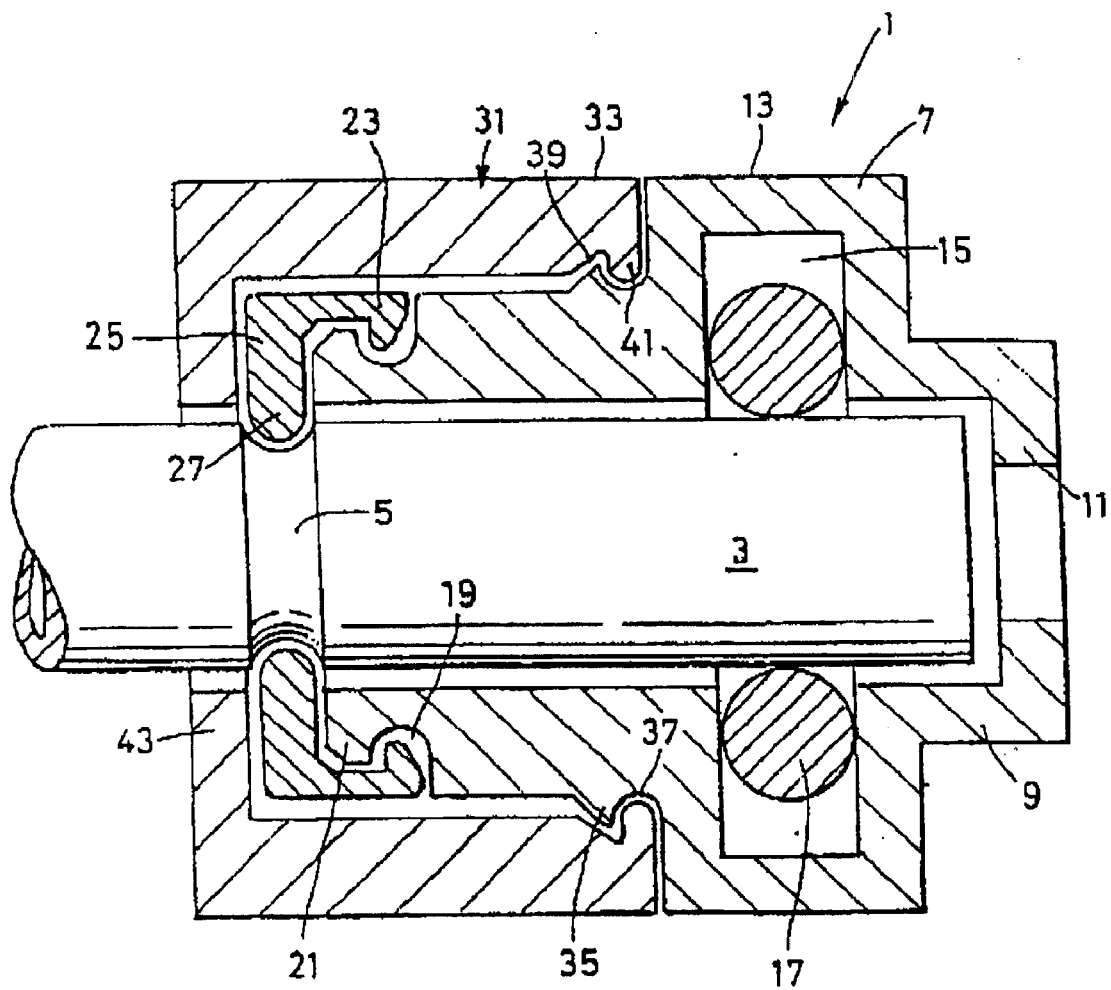
Figure 2:
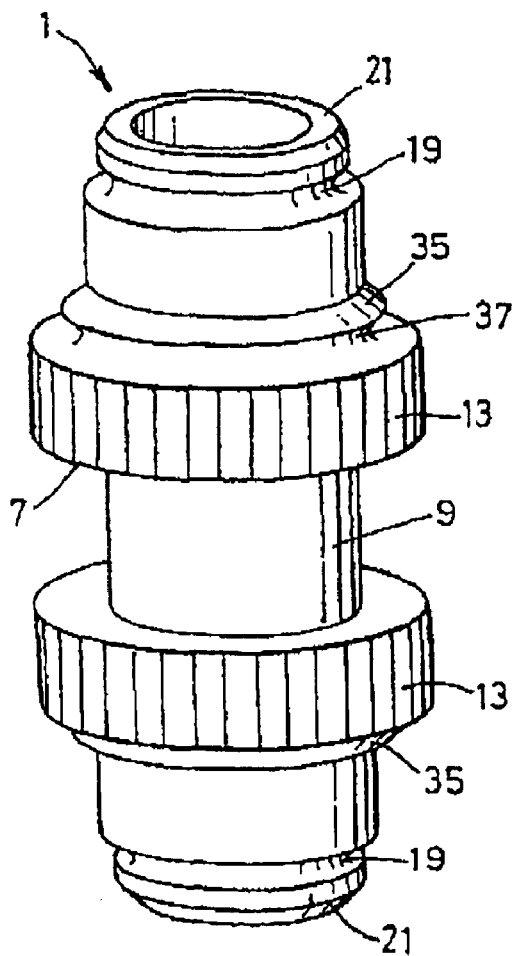
Figure 4:
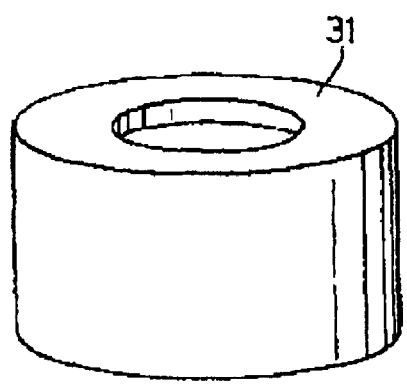
Figure 3:
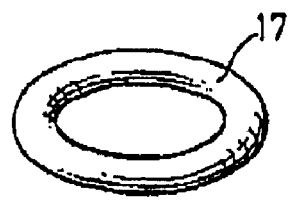
Figure 5:
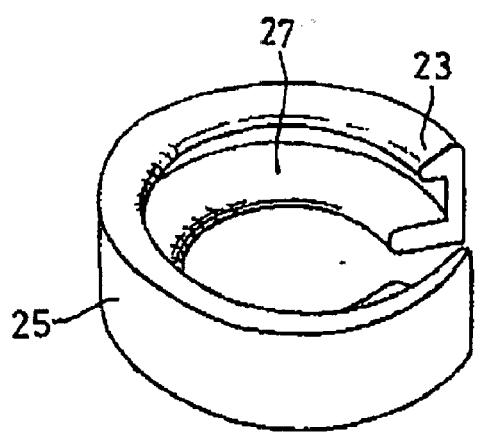
Figure 6:
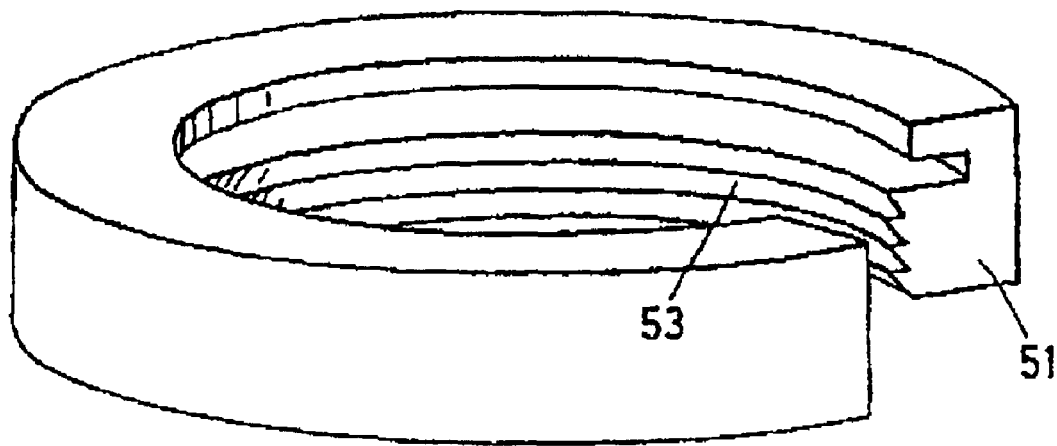
Figure 7:
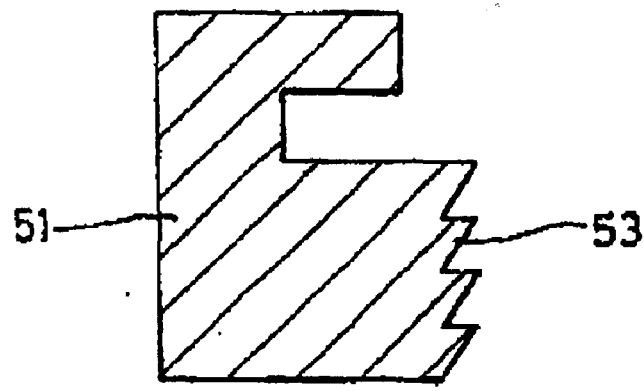
Figure 8:
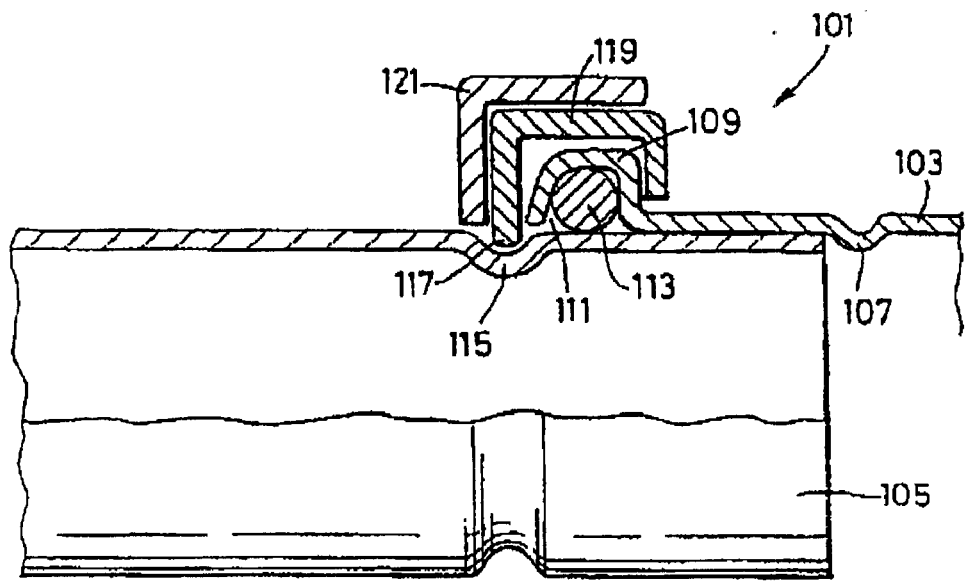
Figure 9:
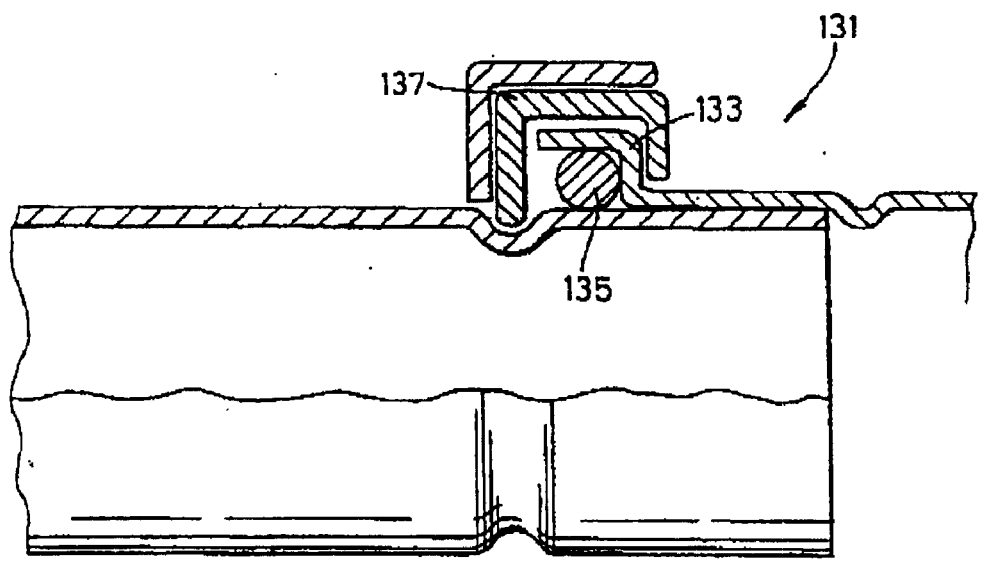
Figure 10:
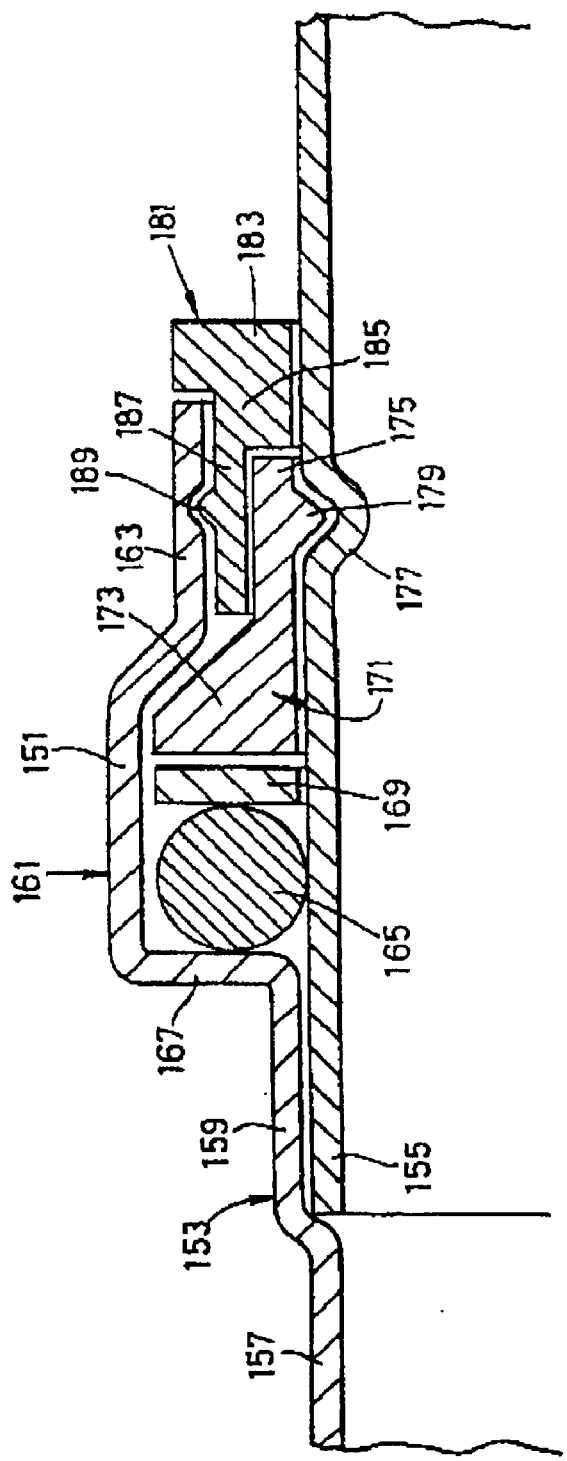
Figure 12:
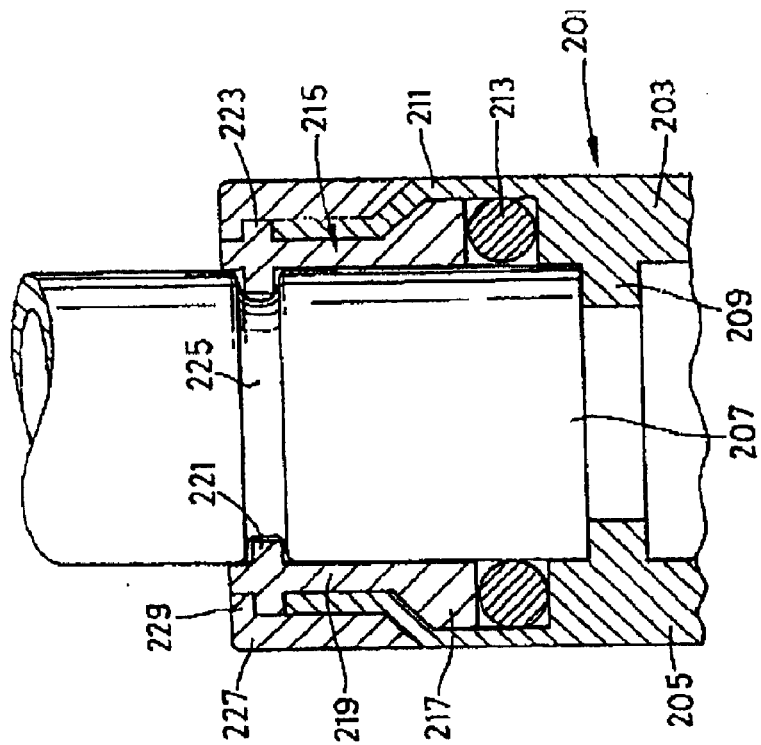
Figure 11:
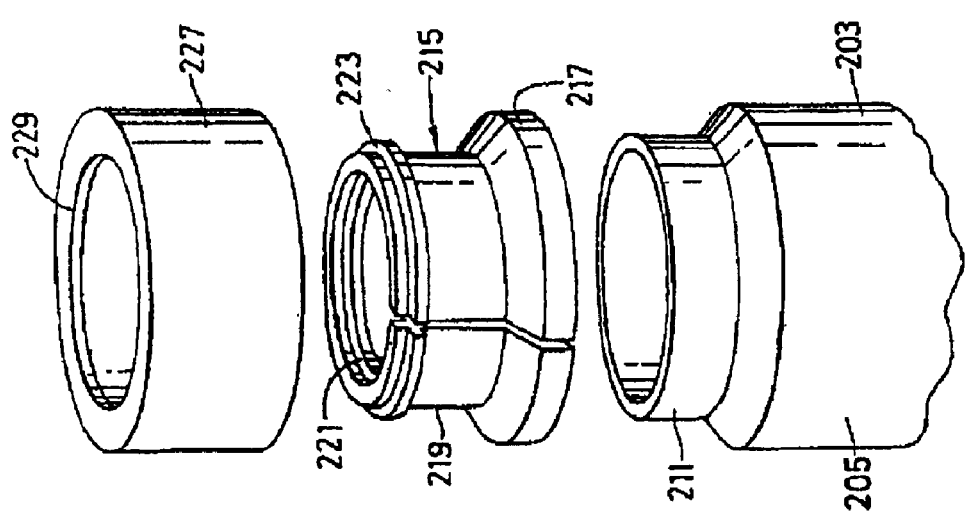
Figure 13:
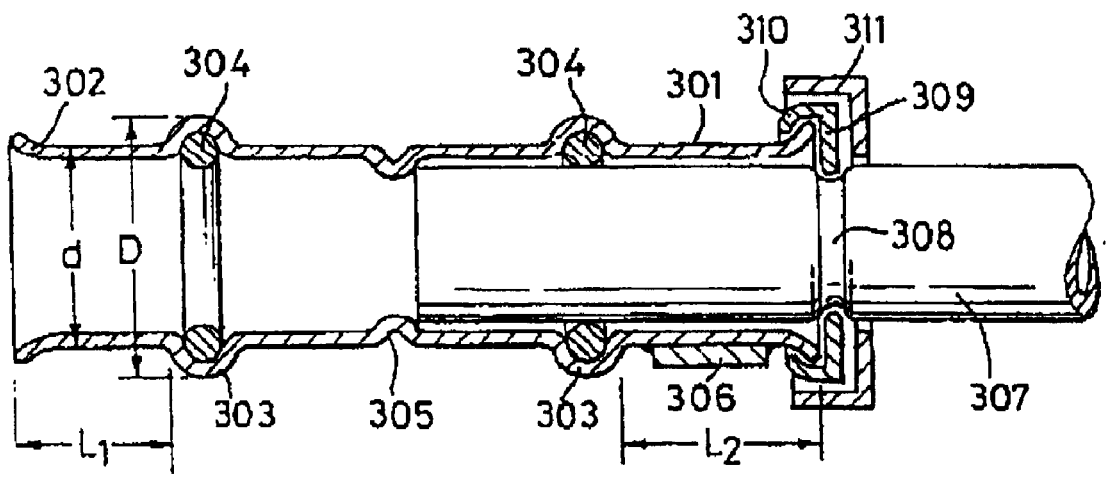
Figure 14:
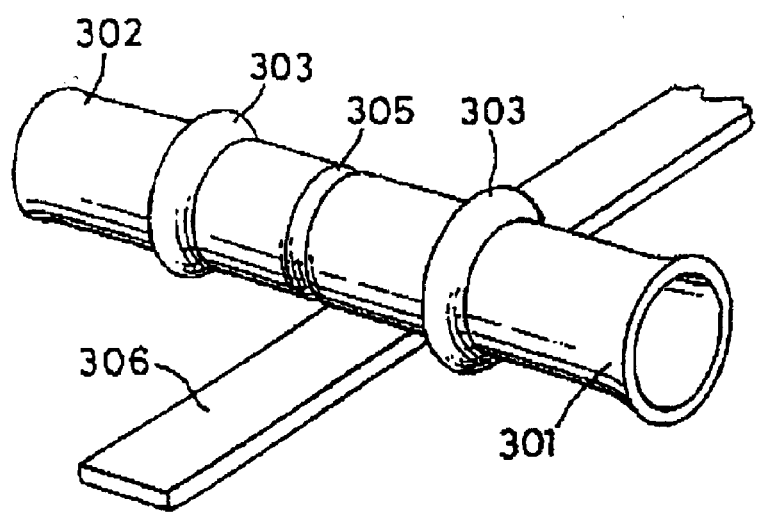
Figure 15:
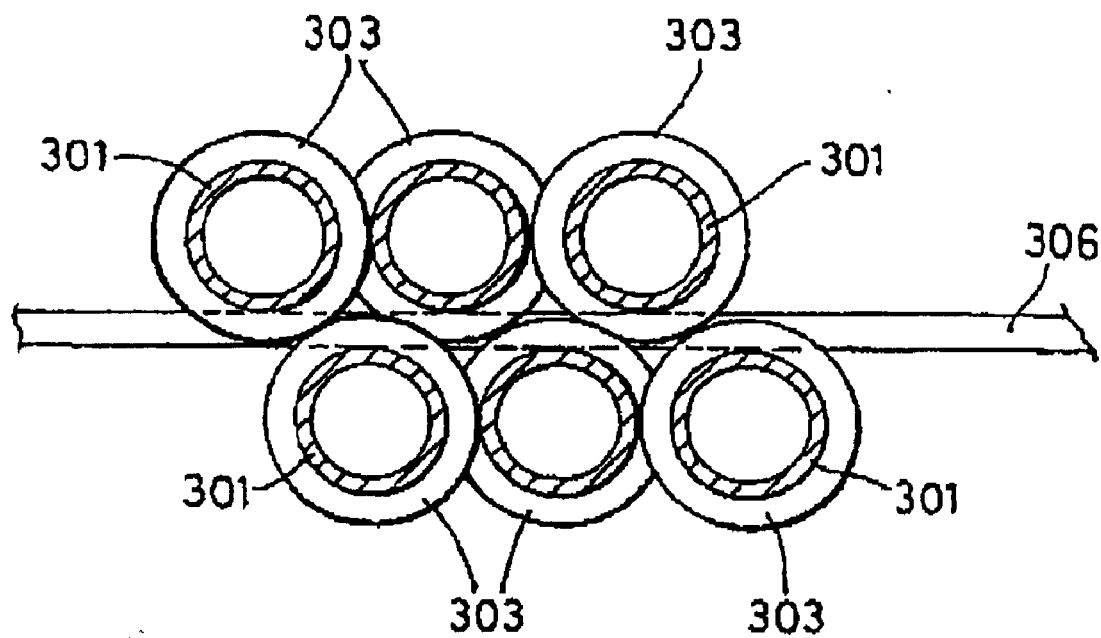
Figure 16:
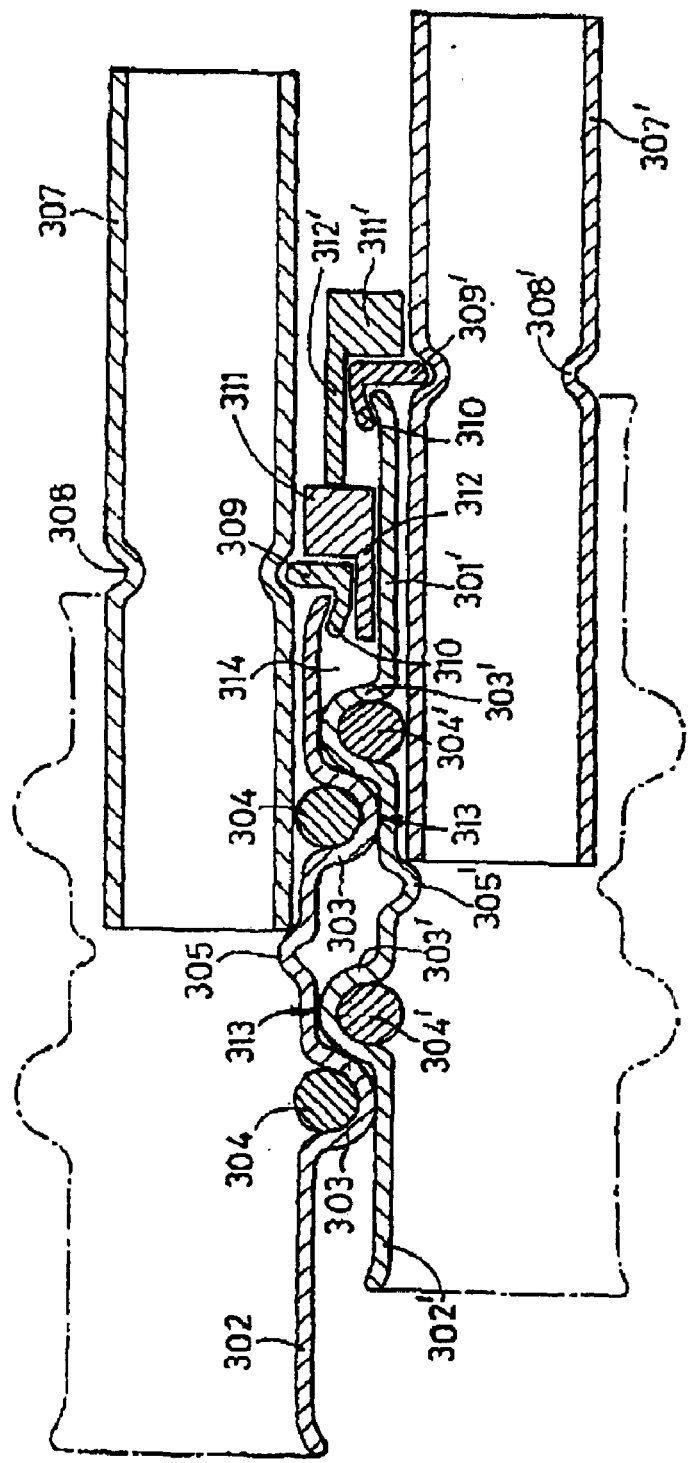
Figure 17:
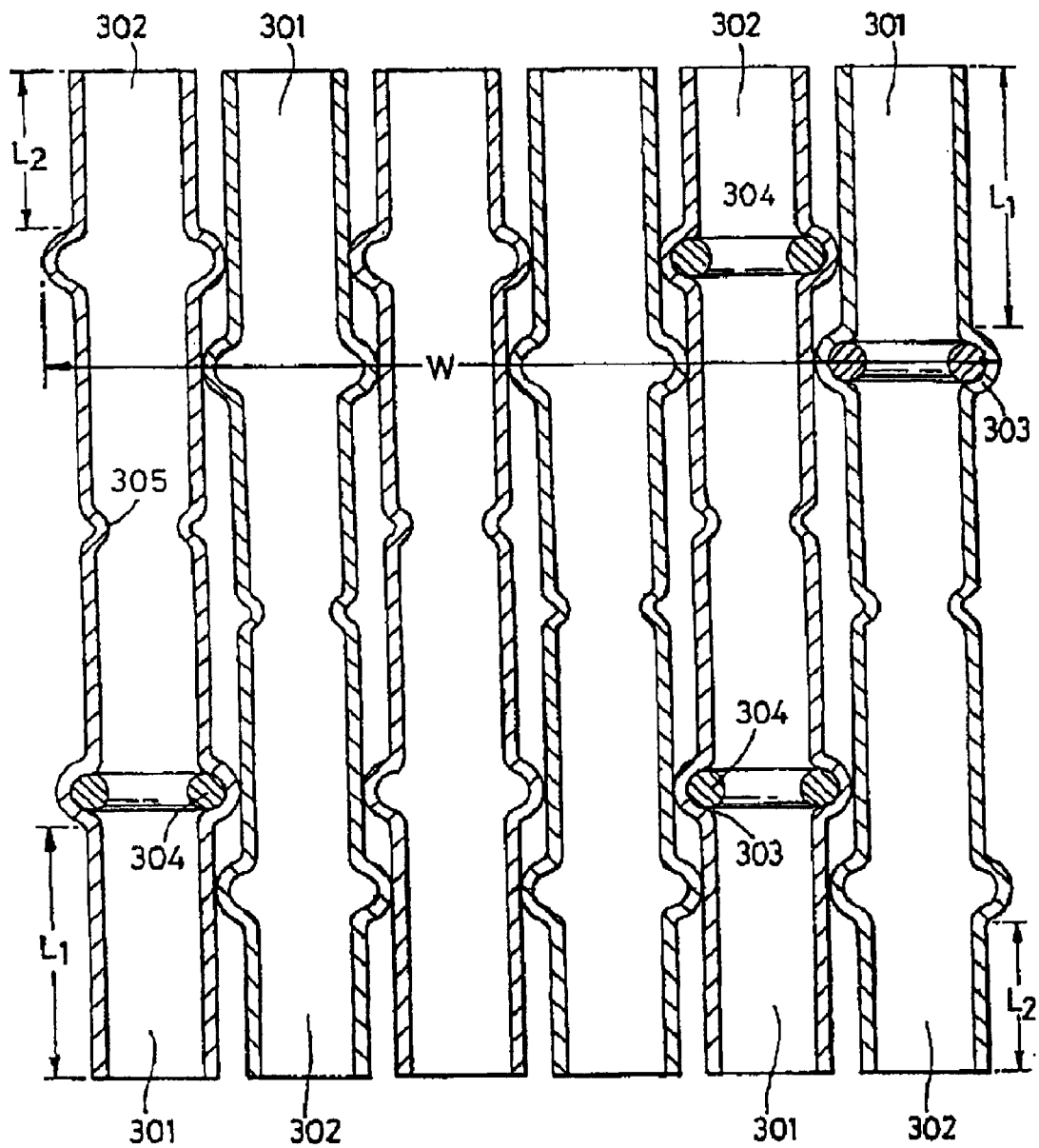

Located between the O-rings 304 is a region of reduced diameter defining a tube stop 305. The coupling member is mechanically connected to other similar coupling members by being spot-welded or otherwise secured to a connecting strip 306 formed of stainless steel or other suitable metal. The thus assembled coupling members are disposed in a head to tail fashion as shown in FIG. 17 so that the housings 303 are staggered by a distance equal to or greater than the axial length of the housing 303 and so that preferably the free ends of the coupling members terminate in spaced parallel planes.

In use, a tubular member in the form of a pipe 307 is pushed into the first socket 301 of the coupling member until its free end abuts against the stop 305. The pipe 307 includes a previously formed circumferential groove 308 in its outer periphery adjacent to the free end of the first socket 301. A resilient collar in the form of a split ring 309 having a flange 310 is pushed over the pipe 307 so that it snaps into the groove 308 with the flange 310 fitting over the free end of the socket 301. An end cap 311 having a flange 312 is then slid over the pipe 307 and pushed onto the split ring 309 so that it prevents the ring 309 from leaving the groove 308.

Figure 15:
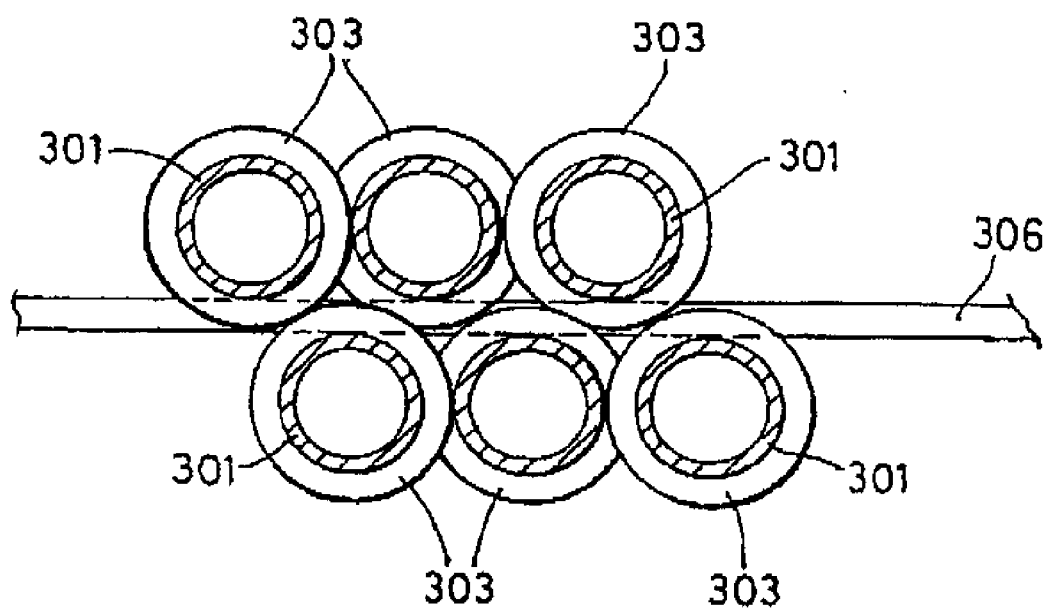
FIG. 15 is a cross-section through a connection assembly including six couplings of the type shown in FIGS. 13 and 14.

Referring now to FIG. 15, there are shown six coupling members of the type described in FIGS. 13 and 14 spot welded to the stainless steel connecting strip 306 with three of the coupling members located in a row on one side of the strip and the other three coupling members located in a row on the other side of the strip. The coupling members are disposed so that their respective housings 303 are staggered so as to minimise the distance between the axes of adjacent coupling members in each row. Moreover, the coupling members in the first row are staggered with respect to the coupling members in the second row so that the spacing between the axes of the coupling members in the first row on the other hand and the axes of the coupling members of the second row on the other hand is minimised. In this way, the amount of space occupied by the connector is as small as possible.

Figure 16:
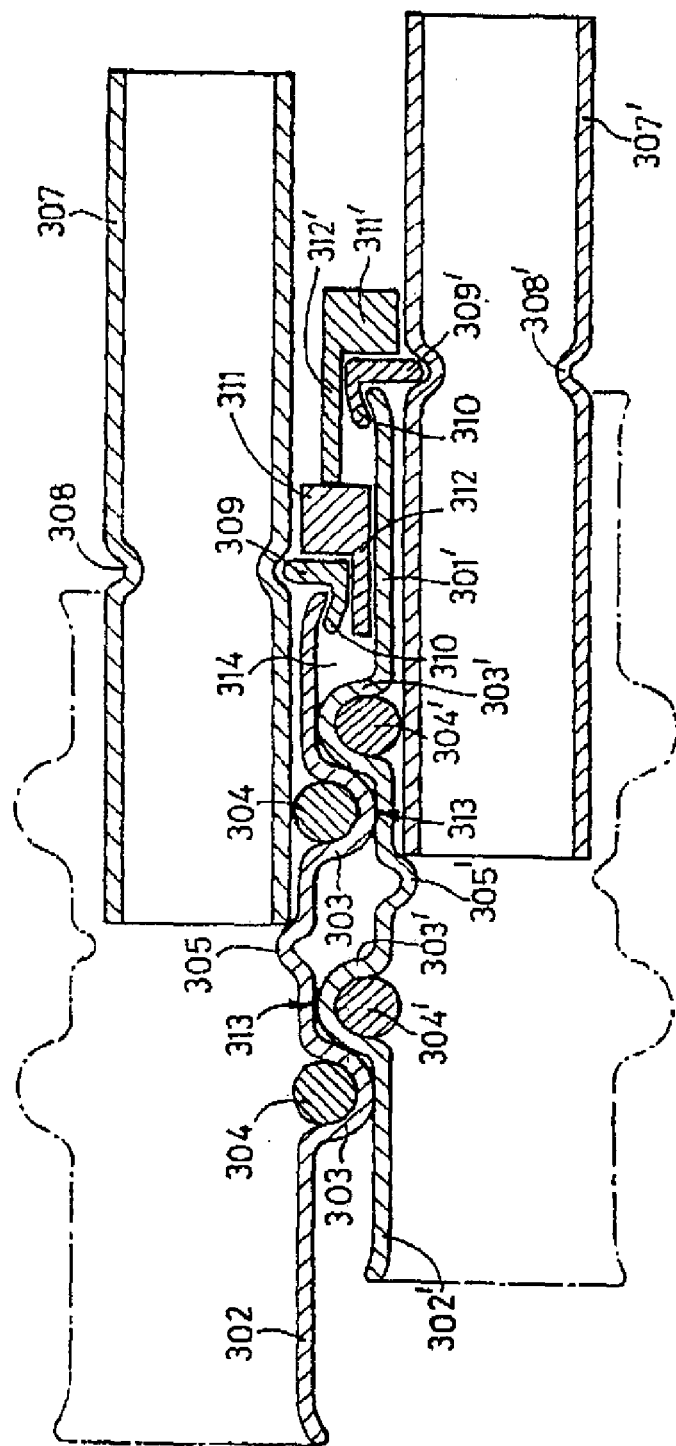
FIG. 16 is a longitudinal section through a still further embodiment of the present invention, in this case showing two straight couplings in a connection assembly.

Referring now to FIG. 16, there is shown a section through a part of a connector in accordance with the present invention including two coupling members 301 and 301'. In the drawing, only the adjacent walls of the two coupling members are shown in full lines, the remainder of the coupling members being shown in dotted outline only. The coupling members are essentially identical to each other and to the coupling members shown in FIG. 13 except that they are spot welded together at locations 313 instead of being spot welded to continuous strip 306. It can be seen that the coupling members 301 and 301' are secured together so that their respective housings 303 and 303' are staggered in the axial direction. In use, pipes 307 and 307' of similar and suitable dimensions are introduced into the first tubular socket portions 301 and 301' of the coupling members until they reach their respective stops 305 and 305'. Flanged split ring 309 is then pushed onto the pipe 307 (expanding to allow this to be done) and snapped into the circumferential groove 308. Cap 311 can then be slid along pipe 307 towards the split ring 309. Similarly, split ring 309' is snapped into groove 308' of pipe 307' and cap 315 is then slid along pipe 307' so as to lock ring 309' in position whilst simultaneously pushing cap 311 onto ring 309 thereby locking ring 309 in position.

Further pipes (not shown) are similarly introduced into the second sockets 302 of the members.

The pipes 307 and 307' can be readily removed from the connector by inserting two steel bars or the like in region 314 and lever in the cap 311 towards the right (as shown in the drawing). This will release the split ring 309. Also, this movement of end cap 311 will dislodge end cap 311 and allow split ring 309' to be released. Pipes 307 and 307' cab then be removed from their respective coupling members.

Referring now to FIG. 17, there is shown a connector comprising six coupling members of the type shown in FIGS. 13 and 14 secured together in head to tail fashion so that the ends of the coupling members are located in one or other of two spaced parallel planes. Parts only of the coupling members are shown in some cases. A first plurality of pipes can be simultaneously inserted into the sockets at one end of the connector and a second plurality of pipes can be simultaneously inserted into the sockets at the other end of the connector. The width W of the connector is given by the formula:

$$W = 3\,D + 3d$$

where D is the outer diameter of the housing 3 and d is the outer diameter of the rest of the coupling member (see FIG. 13). In order to minimise the space occupied by the connector yet facilitate easy assembly of the pipes into the connector, the diameter d is preferably given by the formula:

d=the outside diameter of the pipe+0.03 mm+2×the wall thickness of the coupling member.

Generally, however, the difference between the outside diameter of the tube and the inside diameter of the coupling member may vary from about 0.1 to 0.16 mm.

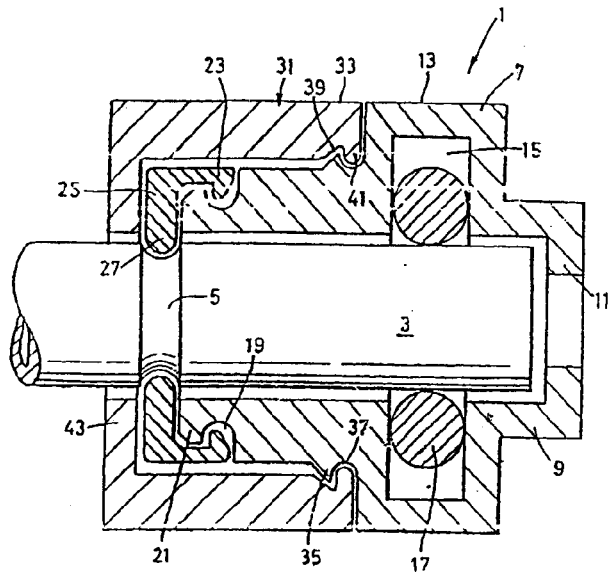

What is claimed is:

1. A dis-assemblable connector for connecting together at least two tubular members, the connector including a body, the body being a separate part from said at least two tubular members, the body having tubular mouth portions, each for receiving one of said tubular members, at least one of said mouth portions being provided with means for connecting the body to a tubular member received in said mouth portion, said connection means comprising sealing means for sealing the body against the tubular member and securing means for preventing relative longitudinal movement between said body and said tubular member, said securing means comprising a first securing member for engagement with the tubular member and being deformable between a tubular engaging position and a position allowing said first securing member to be readily moved along the tubular member, and a second securing member being for holding the first securing member in its tubular member engaging position, said body, said first securing member and said second securing member being adapted to coact to prevent, in use, relative longitudinal movement between said first securing member and said body and wherein ends of said at least two tubular members received in said body are not directly sealed to each other.

2. A connector according to claim 1 wherein the second securing member is in the form of a ring or collar movable longitudinally relative to the tubular member and the mouth portion in order to be located in a position wherein the first securing member is held in its mouth portion engaging position.

3. A connector according to claim 1 wherein the first securing member is in the form of a ring or collar which is circumferentially discontinuous over at least that part of its length which is for engaging the tubular member, thereby allowing radial deformation of said first securing member.

4. A connector according to claim 3 wherein the first securing member is circumferentially discontinuous along its entire length.

5. A connector according to claim 1 wherein the first securing member is provided with an inwardly directed projection for engaging in a recess located in said tubular member.

6. A connector according to claim 1 wherein the first securing member is provided with means for gripping the outer surface of said tubular member.

7. A connector according to claim 1 wherein the mouth portion is located between said first and second securing members.

8. A connector according to claim 1 wherein the first securing member is located between the mouth portion and the second securing member.

9. A connector according to claim 1 wherein the second securing member is located between the mouth portion and the first securing member.

10. A connector according to claim 1 wherein the first securing member has a tubular member engaging portion and, extending longitudinally from said portion towards said sealing means on at least one side thereof, a stabilising portion to prevent disengagement of said tubular member engaging portion from said tubular member when the connector is subjected to distorting forces.

11. A connector according to claim 10 wherein the stabilising portion has a length which is at least one quarter of the external diameter of the tubular member.

12. A connector according to claim 11 wherein the stabilising portion has a length which is at least one half of the external diameter of the tubular member.

13. A connection assembly for connecting together a first plurality of tubular members having parallel longitudinal axes and a second plurality of tubular members having parallel longitudinal axes which connector assembly comprises:

(i) a plurality of connectors, each connector for connecting together at least two tubular members, the connector including a body having tubular mouth portions, each for receiving one of said tubular members, at least one of said mouth portions being provided with means for connecting the body to a tubular member received in said mouth portion, said connection means comprising sealing means for sealing the body against the tubular member and securing means for preventing relatively longitudinal movement between said body and said tubular member, said securing means comprising a first securing member for engagement with the tubular member and being deformable between a tubular member engaging position and a position allowing said first securing member to be readily moved along the tubular member, and a second securing member being for holding the first securing member in its tubular member engaging position, said body, said first securing member and said second securing member being adapted to coact to prevent, in use, relative longitudinal movement between said first securing member and said body, each connector having a first tubular socket at a first end thereof and a second tubular socket at a second end thereof, each of the first tubular sockets having parallel longitudinal axes and being adapted to receive the first plurality of tubular members and each of the second tubular sockets having parallel longitudinal axes and being adapted to receive the second plurality of tubular members so that each tubular socket accommodates one of the tubular members wherein (ii) said connectors are connected together, (iii) each tubular socket includes a circumferentially extending housing, of increased outer dimension compared to the outer dimension of the remainder of the socket, to accommodate a sealing member to provide a fluid tight joint between the socket and the tubular member accommodated therein, (iv) the housing of each of the first tubular sockets is axially staggered with respect to the housing of the first tubular socket adjacent thereto, and (v) the housing of each of the second tubular sockets is axially staggered with respect to the housing of the second tubular socket adjacent thereto.

14. A connection assembly according to claim 13 wherein the connectors are arranged in a row with their first tubular sockets disposed laterally of one another and with their second tubular sockets disposed laterally of one another.

15. A connection assembly for connecting together a first plurality of tubular members having parallel longitudinal axes and a second plurality of tubular members having parallel longitudinal axes which connector assembly comprises:

(i) a plurality of connectors according to claim 1, each connector having a first tubular socket at a first end thereof and a second tubular socket at a second end thereof, each of the first tubular sockets having parallel longitudinal axes and being adapted to receive the first plurality of tubular members and each of the second tubular sockets having parallel longitudinal axes and being adapted to receive the second plurality of tubular members so that each tubular socket accommodates one of the tubular members wherein (ii) said connectors are connected together, (iii) each tubular socket includes a circumferentially extending housing, of increased outer dimension compared to the outer dimension of the remainder of the socket, to accommodate a sealing member to provide a fluid tight joint between the socket and the tubular member accommodated therein, (iv) the housing of each of the first tubular sockets is axially staggered with respect to the housing of the first tubular socket adjacent thereto, and (v) the housing of each of the second tubular sockets is axially staggered with respect to the housing of the second tubular socket adjacent thereto.

16. A connection assembly according to claim 15 wherein the connectors are arranged in a row with their first tubular sockets disposed laterally of one another and with their second tubular sockets disposed laterally of one another.

* * * * *

UNITED STATES PATENT AND TRADEMARK OFFICE
CERTIFICATE OF CORRECTION

PATENT NO. : 6,533,330 B1  Page 1 of 1
DATED : March 18, 2003
INVENTOR(S) : Davidson et al.

It is certified that error appears in the above-identified patent and that said Letters Patent is hereby corrected as shown below:

<u>Title page, Item [54] and Column 1, lines 1 and 2,</u>
The title should read as follows:
-- CONNECTION TOGETHER OF TUBULAR MEMBERS --
Item [57], ABSTRACT,
Line 15, should read as follows:
-- member in its tubular member engaging position.  The body --

<u>Column 5,</u>
Line 20, should read as follows:
-- operations. --

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,533,330 B1
DATED : March 18, 2003
INVENTOR(S) : Davidson et al.

It is certified that error appears in the above-identified patent and that said Letters Patent is hereby corrected as shown below:

Title page, Item [54] and Column 1, lines 1 and 2,
The title should read as follows:
-- CONNECTION TOGETHER OF TUBULAR MEMBERS --

Title page,
Item [57], ABSTRACT,
Line 15, should read as follows:
-- member in its tubular member engaging position.  The body --

Column 5,
Line 20, should read as follows:
-- operations. --

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,533,330 B1
DATED : March 18, 2003
INVENTOR(S) : Paul Davidson et al.

It is certified that error appears in the above-identified patent and that said Letters Patent is hereby corrected as shown below:

Delete the title page and insert therefore the attached title page.

Delete Drawing Sheet 1-10 and insert therefore the attached Drawing Sheets 1-10.

Signed and Sealed this

Twenty-fourth Day of May, 2005

JON W. DUDAS
*Director of the United States Patent and Trademark Office*

(12) United States Patent
Davidson et al.

(10) Patent No.: US 6,533,330 B1
(45) Date of Patent: Mar. 18, 2003

(54) CONNETION TOGETHER OF TUBULAR MEMBERS

(75) Inventors: Paul Davidson, 18 Ploughmans Way, Tytherington, Macclesfield, Cheshire (GB), SK10 2UN; Richard John Wakelin, Harrogate (GB)

(73) Assignee: Paul Davidson (GB)

( * ) Notice: Subject to any disclaimer, the term of this patent is extended or adjusted under 35 U.S.C. 154(b) by 0 days.

(21) Appl. No.: 09/424,908
(22) PCT Filed: Jun. 1, 1998
(86) PCT No.: PCT/GB98/01464
§ 371 (c)(1),
(2), (4) Date: Oct. 11, 2001
(87) PCT Pub. No.: WO98/54505
PCT Pub. Date: Dec. 3, 1998

(30) Foreign Application Priority Data

| | | |
|---|---|---|
| May 30, 1997 | (GB) | 9711139 |
| Jun. 24, 1997 | (GB) | 9713201 |
| Apr. 7, 1998 | (GB) | 9807492 |

(51) Int. Cl.$^7$ ............................................. F16L 21/08
(52) U.S. Cl. ............... 285/305; 285/921; 285/81; 285/124.1; 285/124.2; 285/84
(58) Field of Search .................................. 285/319, 921, 285/81, 82, 84, 86, 124.1, 124.2, 124.4

(56) References Cited

U.S. PATENT DOCUMENTS

| | | | | |
|---|---|---|---|---|
| 2,784,987 A | * | 3/1957 | Corcoran | 285/86 |
| 3,853,338 A | * | 12/1974 | Wilson | 285/86 |
| 4,058,330 A | * | 11/1977 | Wolf | 285/423 |
| 4,225,162 A | * | 9/1980 | Dola | 285/242 |
| 4,332,402 A | * | 6/1982 | Shellhouse | 285/86 |
| 4,834,149 A | * | 5/1989 | Fournier et al. | 604/905 |
| 4,895,570 A | * | 1/1990 | Larkin | 604/905 |
| 5,141,263 A | * | 8/1992 | Varden | 285/921 |
| 5,509,911 A | * | 4/1996 | Cottone, Sr. et al. | 285/315 |
| 5,540,463 A | * | 7/1996 | Potokar | 285/319 |
| 5,725,257 A | * | 3/1998 | Sakane et al. | 285/81 |
| 5,989,240 A | * | 11/1999 | Strowe | 285/81 |
| 6,155,607 A | * | 12/2000 | Hewitt et al. | 285/81 |

* cited by examiner

*Primary Examiner*—Eric K. Nicholson
(74) *Attorney, Agent, or Firm*—Myers Bigel Sibley & Sajovec

(57) ABSTRACT

A connector (1) for connecting together at least two tubular members (3) includes a body (7) having tubular mouth portions, each receiving one of said tubular members. At least one of the mouth portions is provided with means for connecting the body to a tubular member, the connection means comprising sealing means (17) for sealing the body against the tubular member and securing means for preventing relative longitudinal movement between said body and said tubular member. The securing means comprise a first securing member (25) for engagement with the tubular member and being deformable between a tubular member engaging position and a position allowing said first member to be readily moved along the tubular member, and a second securing member (31) being for holding the first securing ember in its tubular member engaging position. The body and first and second securing members are adapted to coact to prevent, in use, relative longitudinal movement between said first securing member and said body. A connection assembly, which includes a plurality of connectors of the invention, is also described.

16 Claims, 10 Drawing Sheets

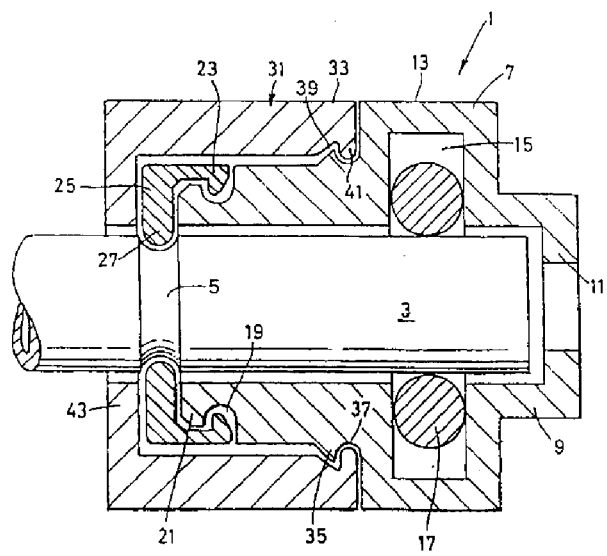

UNITED STATES PATENT AND TRADEMARK OFFICE
CERTIFICATE OF CORRECTION

PATENT NO.   : 6,533,330 B1
DATED        : March 18, 2003
INVENTOR(S)  : Paul Davidson et al.

It is certified that error appears in the above-identified patent and that said Letters Patent is hereby corrected as shown below:

Delete the title page and insert the attached title page.

Delete Drawing Sheet 1-10 and insert the attached Drawing Sheets 1-10.

This certificate supersedes Certificate of Correction issued May 24, 2005.

Signed and Sealed this

Twentieth Day of December, 2005

JON W. DUDAS
*Director of the United States Patent and Trademark Office*

(12) United States Patent
Davidson et al.

(10) Patent No.: US 6,533,330 B1
(45) Date of Patent: Mar. 18, 2003

(54) CONNETION TOGETHER OF TUBULAR MEMBERS

(75) Inventors: Paul Davidson, 18 Ploughmans Way, Tytherington, Macclesfield, Cheshire (GB), SK10 2UN; Richard John Wakelin, Harrogate (GB)

(73) Assignee: Oystertec Plc, Manchester, United Kingdom ( * ) Notice: Subject to any disclaimer, the term of this patent is extended or adjusted under 35 U.S.C. 154(b) by 0 days.

(21) Appl. No.: 09/424,908
(22) PCT Filed: Jun. 1, 1998
(86) PCT No.: PCT/GB98/01464
§ 371 (c)(1),
(2), (4) Date: Oct. 11, 2001
(87) PCT Pub. No.: WO98/54505
PCT Pub. Date: Dec. 3, 1998

(30) Foreign Application Priority Data

| May 30, 1997 | (GB) | 9711139 |
| Jun. 24, 1997 | (GB) | 9713201 |
| Apr. 7, 1998 | (GB) | 9807492 |

(51) Int. Cl.[7] ............................... F16L 21/08
(52) U.S. Cl. .................. 285/305; 285/921; 285/81; 285/124.1; 285/124.2; 285/84
(58) Field of Search .................. 285/319, 921, 285/81, 82, 84, 86, 124.1, 124.2, 124.4

(56) References Cited

U.S. PATENT DOCUMENTS

| 2,784,987 A | * | 3/1957 | Corcoran | 285/86 |
| 3,853,338 A | * | 12/1974 | Wilson | 285/86 |
| 4,058,330 A | * | 11/1977 | Wolf | 285/423 |
| 4,225,162 A | * | 9/1980 | Dola | 285/242 |
| 4,332,402 A | * | 6/1982 | Shellhouse | 285/86 |
| 4,834,149 A | * | 5/1989 | Fournier et al. | 604/905 |
| 4,895,570 A | * | 1/1990 | Larkin | 604/905 |
| 5,141,263 A | * | 8/1992 | Varden | 285/921 |
| 5,509,911 A | * | 4/1996 | Cottone, Sr. et al. | 285/315 |
| 5,540,463 A | * | 7/1996 | Potokar | 285/319 |
| 5,725,257 A | * | 3/1998 | Sakane et al. | 285/81 |
| 5,989,240 A | * | 11/1999 | Strowe | 285/81 |
| 6,155,607 A | * | 12/2000 | Hewitt et al. | 285/81 |

* cited by examiner

*Primary Examiner*—Eric K. Nicholson
(74) *Attorney, Agent, or Firm*—Myers Bigel Sibley & Sajovec

(57) ABSTRACT

A connector (1) for connecting together at least two tubular members (3) includes a body (7) having tubular mouth portions, each receiving one of said tubular members. At least one of the mouth portions is provided with means for connecting the body to a tubular member, the connection means comprising sealing means (17) for sealing the body against the tubular member and securing means for preventing relative longitudinal movement between said body and said tubular member. The securing means comprise a first securing member (25) for engagement with the tubular member and being deformable between a tubular member engaging position and a position allowing said first member to be readily moved along the tubular member, and a second securing member (31) being for holding the first securing ember in its tubular member engaging position. The body and first and second securing members are adapted to coact to prevent, in use, relative longitudinal movement between said first securing member and said body. A connection assembly, which includes a plurality of connectors of the invention, is also described.

16 Claims, 10 Drawing Sheets

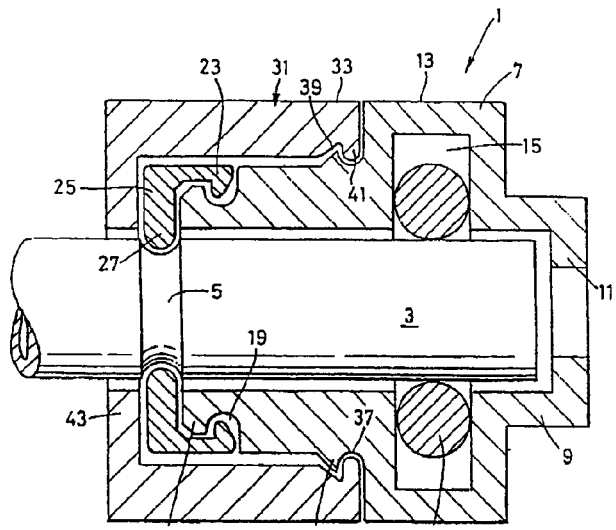

UNITED STATES PATENT AND TRADEMARK OFFICE
CERTIFICATE OF CORRECTION

PATENT NO. : 6,533,330 B1
DATED : March 18, 2003
INVENTOR(S) : Paul Davidson et al.

It is certified that error appears in the above-identified patent and that said Letters Patent is hereby corrected as shown below:

Delete the title page and insert the attached title page.

Delete Drawing Sheet 1-10 and insert the attached Drawing Sheets 1-10.

This certificate supersedes Certificate of Correction issued May 24, 2005.

Signed and Sealed this

Eleventh Day of April, 2006

JON W. DUDAS
*Director of the United States Patent and Trademark Office*

(12) United States Patent
Davidson et al.

(10) Patent No.: US 6,533,330 B1
(45) Date of Patent: Mar. 18, 2003

(54) CONNECTION TOGETHER OF TUBULAR MEMBERS

(75) Inventors: Paul Davidson, 18 Ploughmans Way, Tytherington, Macclesfield, Cheshire (GB), SK10 2UN; Richard John Wakelin, Harrogate (GB)

(73) Assignee: Oystertec Plc, Manchester, United Kingdom (*) Notice: Subject to any disclaimer, the term of this patent is extended or adjusted under 35 U.S.C. 154(b) by 0 days.

(21) Appl. No.: 09/424,908
(22) PCT Filed: Jun. 1, 1998
(86) PCT No.: PCT/GB98/01464
§ 371 (c)(1),
(2), (4) Date: Oct. 11, 2001
(87) PCT Pub. No.: WO98/54505
PCT Pub. Date: Dec. 3, 1998

(30) Foreign Application Priority Data

May 30, 1997 (GB) .............................. 9711139
Jun. 24, 1997 (GB) .............................. 9713201
Apr. 7, 1998 (GB) .............................. 9807492

(51) Int. Cl.$^7$ .............................. F16L 21/08
(52) U.S. Cl. .............. 285/305; 285/921; 285/81; 285/124.1; 285/124.2; 285/84
(58) Field of Search .............................. 285/319, 921, 285/81, 82, 84, 86, 124.1, 124.2, 124.4

(56) References Cited

U.S. PATENT DOCUMENTS

| | | | | |
|---|---|---|---|---|
| 2,784,987 A | * | 3/1957 | Corcoran .............. | 285/86 |
| 3,853,338 A | * | 12/1974 | Wilson ................. | 285/86 |
| 4,058,330 A | * | 11/1977 | Wolf ................... | 285/423 |
| 4,225,162 A | * | 9/1980 | Dola ................... | 285/242 |
| 4,332,402 A | * | 6/1982 | Shellhouse ............ | 285/86 |
| 4,834,149 A | * | 5/1989 | Fournier et al. ....... | 604/905 |
| 4,895,570 A | * | 1/1990 | Larkin ................. | 604/905 |
| 5,141,263 A | * | 8/1992 | Varden ................. | 285/921 |
| 5,509,911 A | * | 4/1996 | Cottone, Sr. et al. ... | 285/315 |
| 5,540,463 A | * | 7/1996 | Potokar ................ | 285/319 |
| 5,725,257 A | * | 3/1998 | Sakane et al. ......... | 285/81 |
| 5,989,240 A | * | 11/1999 | Strowe ................. | 285/81 |
| 6,155,607 A | * | 12/2000 | Hewitt et al. ......... | 285/81 |

* cited by examiner

Primary Examiner—Eric K. Nicholson
(74) Attorney, Agent, or Firm—Myers Bigel Sibley & Sajovec

(57) ABSTRACT

A connector (1) for connecting together at least two tubular members (3) includes a body (7) having tubular mouth portions, each receiving one of said tubular members. At least one of the mouth portions is provided with means for connecting the body to a tubular member, the connection means comprising sealing means (17) for sealing the body against the tubular member and securing means for preventing relative longitudinal movement between said body and said tubular member. The securing means comprise a first securing member (25) for engagement with the tubular member and being deformable between a tubular member engaging position and a position allowing said first member to be readily moved along the tubular member, and a second securing member (31) being for holding the first securing member in its tubular member engaging position. The body and first and second securing members are adapted to coact to prevent, in use, relative longitudinal movement between said first securing member and said body. A connection assembly, which includes a plurality of connectors of the invention, is also described.

16 Claims, 10 Drawing Sheets